(12) United States Patent
Kim et al.

(10) Patent No.: US 12,411,526 B2
(45) Date of Patent: Sep. 9, 2025

(54) DISPLAY DEVICE

(71) Applicant: SAMSUNG DISPLAY CO., LTD., Yongin-si (KR)

(72) Inventors: Youngdo Kim, Yongin-si (KR); Muhyun Kim, Yongin-si (KR); Seohyeon Choi, Yongin-si (KR); Hansun Ryou, Gyeonggi-do (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 251 days.

(21) Appl. No.: 18/166,713

(22) Filed: Feb. 9, 2023

(65) Prior Publication Data

US 2023/0251691 A1 Aug. 10, 2023

(30) Foreign Application Priority Data

Feb. 9, 2022 (KR) .................. 10-2022-0016968

(51) Int. Cl.
 *G06F 1/16* (2006.01)
(52) U.S. Cl.
 CPC .......... *G06F 1/1656* (2013.01); *G06F 1/1643* (2013.01); *G06F 1/1652* (2013.01)
(58) Field of Classification Search
 CPC .................................................. G06F 1/1652
 See application file for complete search history.

(56) References Cited

U.S. PATENT DOCUMENTS

| | | | |
|---|---|---|---|
| 10,345,856 B2 | 7/2019 | Song | |
| 10,429,895 B2 | 10/2019 | Lee | |
| 10,727,425 B2* | 7/2020 | Kim | G06F 3/0443 |
| 11,175,693 B2 | 11/2021 | Song et al. | |
| 11,350,531 B2 | 5/2022 | Han et al. | |
| 12,001,242 B2* | 6/2024 | Cho | G06F 1/1616 |
| 2014/0329048 A1* | 11/2014 | Jung | H10K 50/844 |
| | | | 428/221 |
| 2018/0192527 A1* | 7/2018 | Yun | G09F 9/301 |
| 2019/0146556 A1* | 5/2019 | Mizoguchi | G06F 1/1681 |
| | | | 361/679.27 |
| 2020/0022267 A1* | 1/2020 | Han | B32B 27/065 |
| 2020/0119291 A1 | 4/2020 | Jeon | |
| 2020/0371564 A1 | 11/2020 | Kim et al. | |
| 2020/0389986 A1* | 12/2020 | Tsuchihashi | G06F 3/041 |
| 2021/0026407 A1 | 1/2021 | Park et al. | |

(Continued)

FOREIGN PATENT DOCUMENTS

| | | |
|---|---|---|
| KR | 10-2018-0062272 A | 6/2018 |
| KR | 10-2019-0050325 | 6/2019 |

(Continued)

*Primary Examiner* — Adrian S Wilson
(74) *Attorney, Agent, or Firm* — F. CHAU & ASSOCIATES, LLC

(57) ABSTRACT

A display device includes a foldable display panel, a reinforcing member disposed in one surface of the display panel and that supports an entire surface of the display panel, and a cushion layer disposed in one surface of the reinforcing member. The reinforcing member includes a first reinforcing member layer and a second reinforcing member layer that is inserted into the first reinforcing member layer or at least partially surrounds the first reinforcing member layer, and one of the first reinforcing member layer or the second reinforcing member layer has an open area that is at least partially open.

21 Claims, 24 Drawing Sheets

(56) References Cited

U.S. PATENT DOCUMENTS

| | | | |
|---|---|---|---|
| 2021/0261090 A1 | 8/2021 | Ha et al. | |
| 2021/0365072 A1* | 11/2021 | Kinoshita | G06F 1/1616 |
| 2022/0137669 A1* | 5/2022 | Horiuchi | G06F 1/1656 |
| | | | 312/223.2 |
| 2022/0189349 A1* | 6/2022 | Roh | B32B 15/08 |
| 2022/0229469 A1* | 7/2022 | Cho | G06F 1/1641 |
| 2022/0243096 A1* | 8/2022 | Kim | B32B 27/38 |
| 2023/0049336 A1* | 2/2023 | Jang | G06F 1/1652 |

FOREIGN PATENT DOCUMENTS

| | | |
|---|---|---|
| KR | 10-2019-0081341 A | 7/2019 |
| KR | 10-2019-0082339 A | 7/2019 |
| KR | 10-2020-0006646 A | 1/2020 |
| KR | 10-2020-0041412 | 4/2020 |
| KR | 10-2021-0011555 | 2/2021 |
| KR | 10-2021-0103027 | 8/2021 |

* cited by examiner

DISPLAY DEVICE

CROSS-REFERENCE TO RELATED APPLICATION

This application claims priority under 35 U.S.C. § 119 from Korean Patent Application No. 10-2022-0016968, filed on Feb. 9, 2022 in the Korean Intellectual Property Office, the contents of which are herein incorporated by reference in their entirety.

TECHNICAL FIELD

One or more embodiments are directed to a device, and more particularly, to a display device.

DISCUSSION OF THE RELATED ART

Mobile electronic devices, such as portable electronic devices, tablet PCs, as well as small-sized electronic devices, such as mobile phones, are becoming more widely used.

A portable electronic device typically includes a display device that can support various functions and provide a user with visual information, such as images or videos. As the size of components for driving a display device has been reduced, the relevance of the display device in an electronic device has gradually increased, and a structure that can be bent from a flat state to a predetermined angle has been developed.

Display devices can be used with an expanded screen by being folded or unfolded in various ways. When a display device is used in an unfolded state, a folded area may be or may not be visible to a user according to flatness of a display panel. When a folded area of the display panel is visible to the user, a distorted image may be provided to the user.

SUMMARY

One or more embodiments of the present disclosure provide a display device that can implement a flat surface while being unfolded.

According to an embodiment of the disclosure, a display device includes a foldable display panel, a reinforcing member disposed on one surface of the display panel and that supports an entire surface of the display panel, and a cushion layer disposed in one surface of the reinforcing member. The reinforcing member includes a first reinforcing member layer, and a second reinforcing member layer that is inserted into the first reinforcing member layer or at least partially surrounds the first reinforcing member layer. One of the first reinforcing member layer or the second reinforcing member layer has an open area that is at least partially open.

One of the first reinforcing member layer or the second reinforcing member layer may include at least one of metal, glass reinforced fiber, or carbon reinforced fiber.

An other of the first reinforcing member layer or the second reinforcing member layer may include at least one of a silicon-based polymer, a urethane-based polymer, an aramid-based polymer, or elastomer.

The open area may include a plurality of open areas, and the plurality of open areas may be spaced apart from each other at constant intervals.

The open area may have at least one of a non-defined shape, a polygonal shape, a circular shape, or an elliptical shape.

The reinforcing member may further include an auxiliary layer disposed in the opening area.

The auxiliary layer may be connected to one of the first reinforcing member layer or the second reinforcing member layer.

A cross-sectional area of the auxiliary layer perpendicular to a lengthwise direction of the auxiliary layer may be less than a cross-sectional area of at least one of the first reinforcing member layer or the second reinforcing member layer perpendicular to a lengthwise direction of at least one of the first reinforcing member layer or the second reinforcing member layer.

The display device further includes a digitizer disposed on a lower surface of the reinforcing member or between the reinforcing member and the display panel.

A thickness of the reinforcing member may be from about 50 µm to about 200 µm.

According to an embodiment, a display device includes a cover member, a display panel disposed on a lower portion of the cover member; a reinforcing member disposed on a lower portion of the display panel; and a digitizer disposed on a lower portion of the reinforcing member. The reinforcing member includes a first reinforcing member layer that has a lattice shape, and a second reinforcing member layer disposed on a surface of the first reinforcing member layer or that surrounds the first reinforcing member layer.

The lattice shape may include a plurality of open areas, and the open areas may have at least one of a circular shape, a polygonal shape, an elliptical shape, or a non-defined shape.

At least a part of the second reinforcing member layer has the lattice shape.

One of the first reinforcing member layer or the second reinforcing member layer may include at least one of metal, glass reinforced fiber, or carbon reinforced fiber, and an other of the first reinforcing member layer or the second reinforcing member layer may include at least one of a silicon-based polymer, an urethane-based polymer, an aramid-based polymer, or elastomer.

An elastic coefficient of one of the first reinforcing member layer or the second reinforcing member layer may be from about 10 GPa to about 70 GPa.

An elastic coefficient of an other one of the first reinforcing member layer or the second reinforcing member layer may be from about 0.1 GPa to about 10 GPa.

The reinforcing member may further include an auxiliary layer connected to the first reinforcing member layer and disposed in the open areas.

A cross-sectional area of the auxiliary layer may be less than a cross-sectional area of the first reinforcing member layer.

A thickness of the first reinforcing member layer may be from about 10 µm to about 100 µm.

A thickness of the reinforcing member may be from about 50 µm to about 200 µm.

According to an embodiment, a display device includes a foldable display panel and a reinforcing member disposed on one surface of the display panel and that supports an entire surface of the display panel. The reinforcing member includes a first reinforcing member layer that has a lattice shape that includes an open area, and a second reinforcing member layer that is inserted into the first reinforcing member layer or at least partially surrounds the first reinforcing member layer.

Such general and specific embodiments of the disclosure may be performed using systems, methods, computer-readable storage mediums, and/or combinations thereof.

DETAILED DESCRIPTION

Figure 1A:
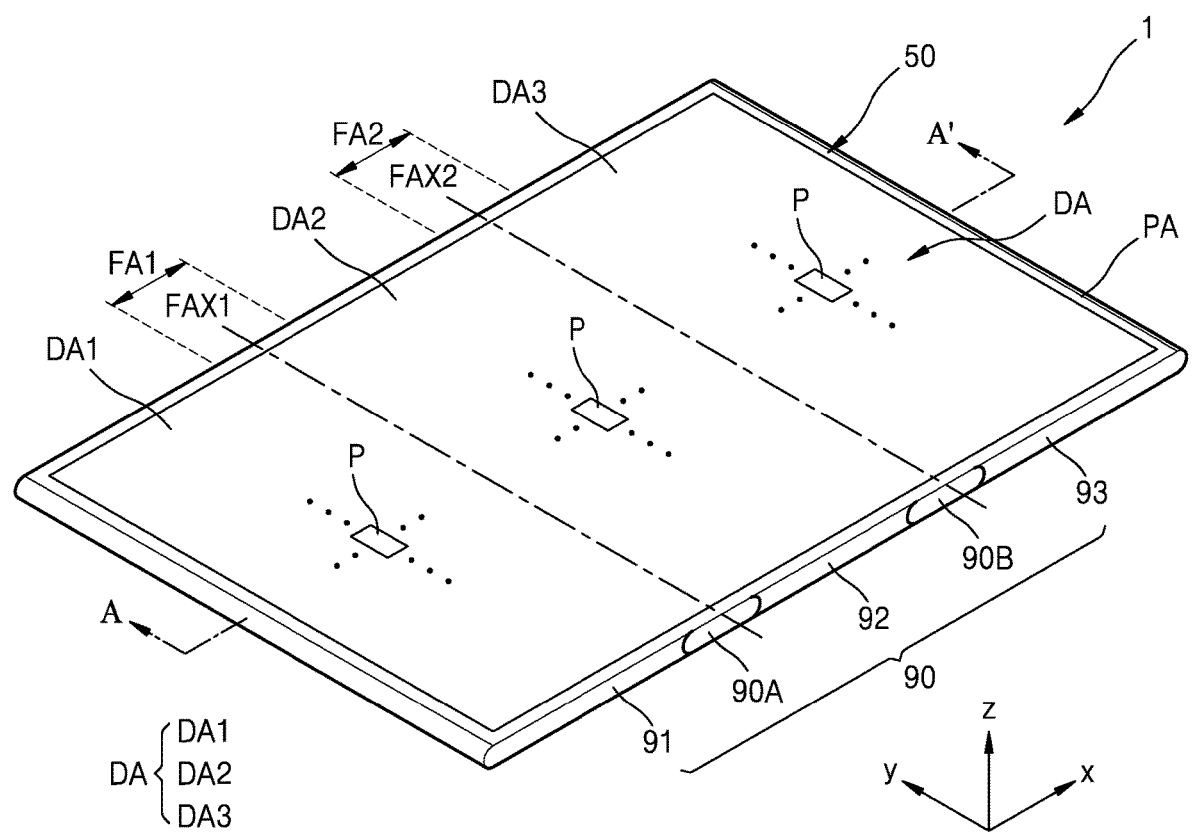
FIG. 1A is a perspective view of a display device according to an embodiment of the disclosure.

Reference will now be made in detail to embodiments, examples of which are illustrated in the accompanying drawings, wherein like reference numerals may refer to like elements throughout.

The term "about" as used herein is inclusive of the stated value and means within an acceptable range of deviation for the particular value as determined by one of ordinary skill in the art, considering the measurement in question and the error associated with measurement of the particular quantity, such as the limitations of the measurement system. For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

The embodiments will be described below in more detail with reference to the accompanying drawings. Those components that are the same or are in correspondence are rendered the same reference numeral regardless of the figure number, and redundant explanations are omitted.

It will be understood that when a layer, region, or component is referred to as being "formed on" another layer, region, or component, it may be directly or indirectly formed on the other layer, region, or component.

The x-axis, the y-axis and the z-axis are not limited to three axes of the rectangular coordinate system, and may be interpreted in a broader sense.

FIG. 1A is a perspective view of a display device 1 according to an embodiment of the disclosure. In detail, FIG. 1A is a perspective view of the display device 1 in an unfolded state, and FIG. 1B is a perspective view of the display device 1 in a folded state.

Figure 1B:
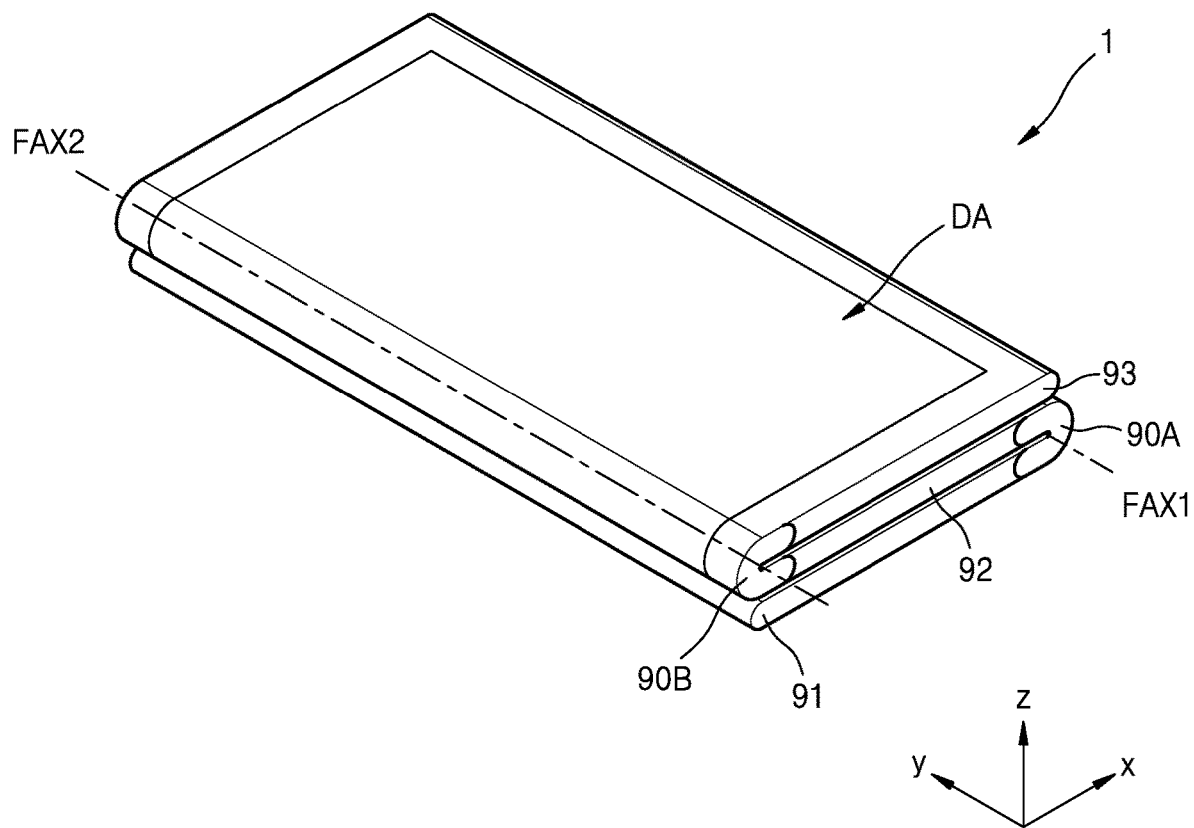
FIG. 1B is a perspective view of a display device in a folded state according to an embodiment of the disclosure.

Referring to FIGS. 1A and 1B, in an embodiment, the display device 1 displays video or still images and can be used as a portable electronic device, such as a mobile phone, a smartphone, a tablet personal computer (PC), a mobile communication terminal, an electronic notebook, an electronic book, a portable multimedia player (PMP), a navigation terminal, an ultra-mobile PC (UMPC), etc., and also as a display screen in various products, such as a television, a laptop computer, a monitor, a billboard, internet of things (IoT), etc. In addition, the display device 1 can be used in a wearable device, such as a smart watch, a watch phone, a glasses-type display, and a head mounted display (HMD). In addition, the display device 1 can be used in a dashboard of a vehicle, a center information display in a center fascia or dashboard of a vehicle, a rear-view mirror display that replaces a side-view mirror of a vehicle, and a display in a rear side of a front seat as entertainment for the back seat in a vehicle.

The display device 1 includes a display panel 50 and a lower cover 90. The display panel 50 includes a display area DA that displays images, and a peripheral area PA around the display area DA. Pixels P that each include a display element are arranged in the display area DA. A plurality of pixels P are provided and are spaced apart from each other. The pixels P may emit light of different colors. The display device 1 provides images by emitting light from pixels P in the display area DA. The peripheral area PA is a non-display area in which the pixels P are not arranged.

The display area DA includes a first display area DA1, a second display area DA2, and a third display area DA3. The pixels P may be arranged in each of the first display area DA1, the second display area DA2, and the third display area DA3. The display device 1 provides images via the pixels P arranged in the first display area DA1, the second display area DA2, and the third display area DA3. The first display area DA1, the second display area DA2, and the third display area DA3 are surrounded by the peripheral area PA.

The display panel 50 displays (outputs) information processed by the display device 1. For example, the display panel 50 displays information about an execution screen of an application being executed by the display device 1, or displays information in a user interface (UI) or a graphical user interface (GUI) according to the execution screen information. The display panel 50 includes a display layer that displays the image and a touchscreen layer that senses a touch input from a user. As such, the display panel 50 functions as one of the input devices that provide an input interface between the display device 1 and the user, and at the same time, functions as one of the output units that provide an output interface between the display device 1 and the user.

Hereinafter, according to an embodiment, the display device 1 will be described as being an organic light-emitting display device, however, embodiments of the disclosure are not necessarily limited thereto. In an embodiment, the display apparatus 1 may include an inorganic light-emitting display or an inorganic EL display apparatus, or a quantum dot light-emitting display apparatus. For example, in embodiments, a light-emitting layer of a display element in the display apparatus 1 may include an organic material, an inorganic material, quantum dots, an organic material and quantum dots, or an inorganic material and quantum dots.

In an embodiment, the display panel 50 is a flexible display panel that can be easily curved, folded, or rolled. For example, the display panel 50 includes one of a foldable display panel, a curved display panel that has curved display surface, a bendable display panel that has a bendable region other than the display surface, a rollable display panel that is rollable and spreadable, or a stretchable display panel. In an embodiment, the display panel 50 includes a rigid display panel that is rigid and not easily bendable.

In an embodiment, the display panel 50 includes a first folding axis FAX1 and a second folding axis FAX2. The display panel 50 can be folded about the first folding axis FAX1 and the second folding axis FAX2. For example, a first foldable area FA1 between the first display area DA1 and the second display area DA2 can be folded about the first folding axis FAX1, and a second foldable area FA2 between the second display area DA2 and the third display area DA3 can be folded about the second folding axis FAX2.

The first display area DA1 and the second display area DA2 are defined with the first folding axis FAX1 therebetween. In addition, the second display area DA2 and the third display area DA3 are defined with the second folding axis FAX2 therebetween.

The lower cover 90 configures a lower outer appearance of the display device 1. The lower cover 90 may include plastic, metal, or both plastic and metal. The lower cover 90 includes a first lower cover part 91 that supports the display panel 50, a second lower cover part 92, and a third lower cover part 93. The lower cover 90 can be folded about the first folding axis FAX1 between the first lower cover part 91 and the second lower cover part 92. In addition, the lower cover 90 can be folded about the second folding axis FAX2 between the second lower cover part 92 and the third lower cover part 93.

In an embodiment, a first hinge portion 90A is provided between the first lower cover part 91 and the second lower cover part 92, and a second hinge portion 90B is provided between the second lower cover part 92 and the third lower cover part 93.

In an embodiment, the first display area DA1 and the second display area DA2 can be folded to face each other based on the first folding axis FAX1. For example, the first lower cover part 91 and the second lower cover part 92 can be folded to not face each other based on the first folding axis FAX1. In an embodiment, the first display area DA1 and the second display area DA2 can be folded face each other based on the first folding axis FAX1.

In an embodiment, the second display area DA2 and the third display area DA3 can be folded to not face each other based on the second folding axis FAX2. For example, the second lower cover part 92 and the third lower cover part 93 can be folded to not face each other based on the second folding axis FAX2. In an embodiment, the second display area DA2 and the third display area DA3 can be folded to face each other based on the second folding axis FAX2.

In an embodiment, when the first display area DA1 and the second display area DA2 are folded to face each other, for example, are in-folding, a curvature of a folded portion is 5R or less. In embodiments, when the first display area DA1 and the second display area DA2 are in-folded to face each other, a curvature of a folded portion may be 3R, 1R, or less.

In an embodiment, when the second display area DA2 and the third display area DA3 are folded to not face each other, for example, are out-folded, a curvature of the folded portion is 5R or less. In embodiments, when the second display area DA2 and the third display area DA3 are out-folded to not face each other, a curvature of the folded portion is 4R or less.

Figure 1C:
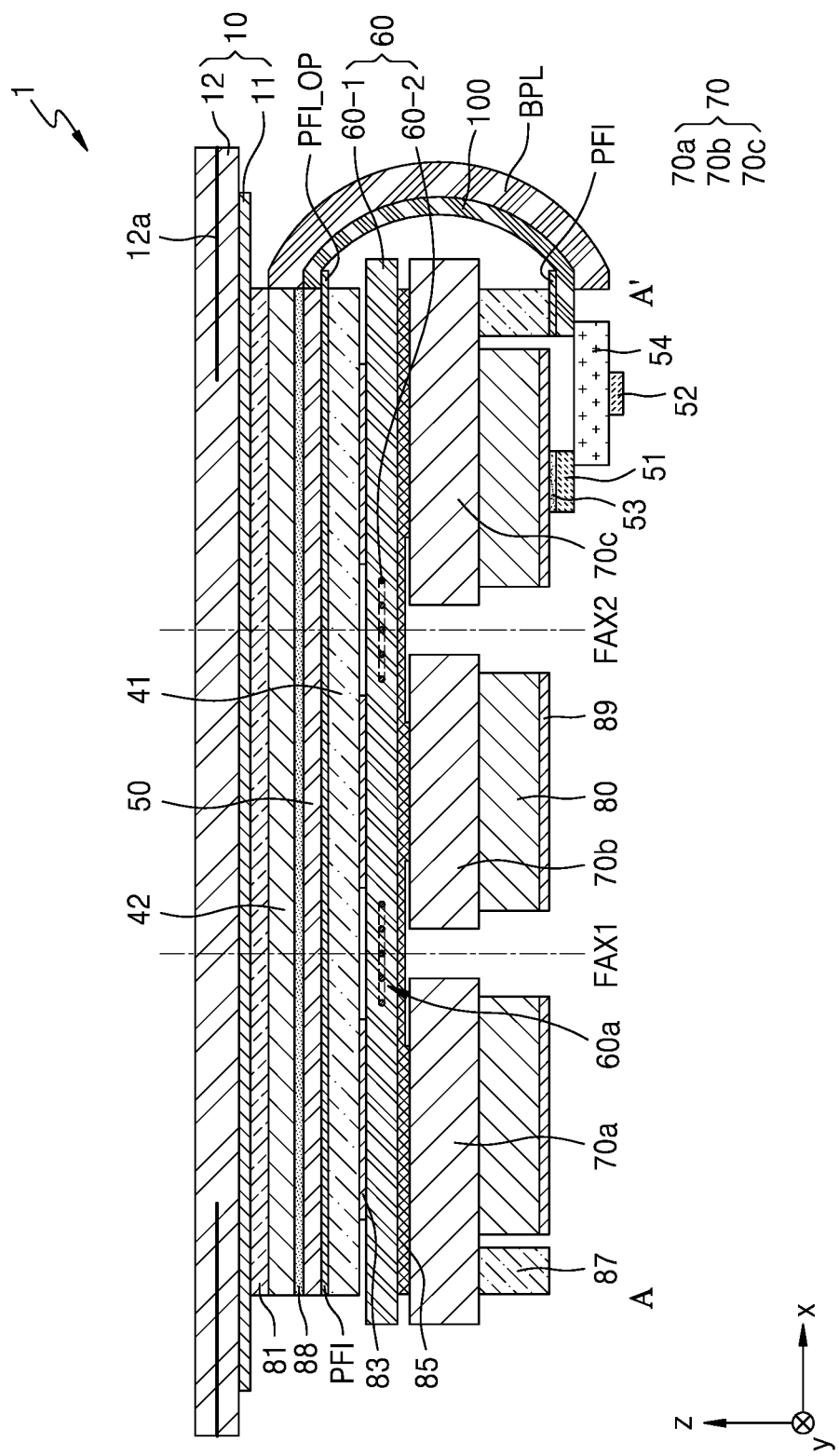
FIG. 1C is a cross-sectional view of a display device of FIG. 1A taken along line A-A'.

FIG. 1C is a cross-sectional view of a display device of FIG. 1A taken along line A-A'.

Referring to FIG. 1C, in an embodiment, a cover member 10 is disposed on the display panel 50. In an embodiment, the cover member 10 covers an upper portion of the display panel 50. The cover member 10 protects the upper surface of the display panel 50.

In addition, in an embodiment, the cover member 10 includes a light-transmitting cover portion and a light-shielding cover portion, where the light-transmitting cover portion corresponds to the display panel 50 and the light-shielding cover portion corresponds to an area other than the display panel 50. The light-shielding cover portion includes an opaque material that shields light. The light-shielding cover portion includes a pattern that is visible to a user when an image is not displayed.

In an embodiment, the cover member 10 includes a cover window 11 and a protective member 12. In an embodiment, the cover window 11 includes a transparent material. For example, the cover window 11 may include glass, a synthetic resin that includes a transparent material, etc. The cover window 11 includes at least one layer.

In an embodiment, the protective member 12 is disposed on an upper surface of the cover window 11 to prevent or reduce scratches on the cover window 11. An opaque layer 12a is formed in part of the protective member 12. In an embodiment, the opaque layer 12a is arranged at an edge of the protective member 12. The opaque layer 12a blocks light.

The display panel 50 is disposed under the cover member 10. The display panel 50 is connected to a display circuit board 51 by a first flexible film 54. A touch sensor driver 53 (see FIG. 3) is disposed on the display circuit board 51, and a display driver 52 is disposed on the first flexible film 54. In an embodiment, the display driver 52 is disposed directly on a substrate 100 of the display panel 50. For example, the display panel 50 and the display circuit board 51 are connected to each other by the first flexible film 54, or the display panel 50 is directly connected to the display circuit board 51. The substrate 100 of the display panel 50 is at least partially bent. A bending protective layer BPL is disposed on the bent portion of the substrate 100 to prevent cracks from generating in the substrate 100. The bending protective layer BPL includes a polymer resin, such as a polyethylene terephthalate (PET) or a polyimide (PI) mesh, etc.

The bending protective layer BPL shields a bendable region of the display panel 50. One end of the bending protective layer BPL is in contact with an end of a functional layer 42 in a cross-section.

In an embodiment, the functional layer 42 is disposed on the display panel 50, and a panel protective member 41 is disposed under the display panel 50. The functional layer 42 is interposed between the cover window 11 and the display panel 50. In addition, a touchscreen layer through which a touch signal input is received from a user is provided on the display panel 50.

In an embodiment, the functional layer 42 is disposed on the touchscreen layer. The functional layer 42 includes an anti-reflection layer. The anti-reflection layer reduces reflectivity of external light incident through the display device 1.

In some embodiments, the anti-reflection layer includes a polarization film. The polarization film includes a linear polarization plate and a phase retardation film, such as a λ/4 (quarter-wave) plate. The phase retardation film is disposed on the touchscreen layer, and the linear polarization plate is a disposed on the phase retardation film.

In an embodiment, the anti-reflection layer includes a filter layer that includes a black matrix and color filters. The color filters are arranged based on a color of light emitted from each of sub-pixels in the display device 1. For example, the filter layer includes a red, green, and blue color filter. For example, the display panel 50 includes a filter layer. The filter layer is disposed on a touchscreen layer of the display panel 50 without using an additional adhesive layer.

In an embodiment, the anti-reflection layer includes a destructive interference structure. The destructive interference structure includes a first reflective layer and a second reflective layer arranged on different layers. First reflected light and second reflected light that are respectively reflected by the first reflective layer and the second reflective layer destructively interfere with each other, and accordingly, a reflectivity of external light is reduced.

In an embodiment, the functional layer 42 further includes a shock absorbing layer. The shock absorbing layer protects structures, such as the display panel thereunder, against external shock. In an embodiment, the shock absorbing layer includes a polymer film. The polymer film includes, for example, at least one of polyethylene terephthalate (PET), polyethylene naphthalate (PEN), polyether sulfone (PES), polyimide (PI), polyarylate (PAR), polycarbonate (PC), polymethyl methacrylate (PMMA), or cyclo olefin copolymer (COC).

In an embodiment, the functional layer 42 includes an anti-reflection layer and a shock absorbing layer. The anti-reflection layer and the shock absorbing layer are sequentially stacked on the display panel 50.

The functional layer 42 determines the positions of the ends of the bending protective layer BPL. For example, the bending protective layer BPL is formed of a resin that is supplied onto the substrate 100 of the display panel 50. Because the bending protective layer BPL is flowable, the bending protective layer BPL can flow in various directions on the display panel 50 without staying at a certain position on the display panel 50. However, when the functional layer 42 is disposed on the display panel 50, ends of the functional layer 42 prevent the bending protective layer BPL from flowing into the region of the display panel 50 in which the functional layer 42 is disposed, and limit the region on which the bending protective layer BPL flows. Therefore, the bending protective layer BPL is arranged only in the peripheral area of the display panel 50 and may in the display area DA.

A fifth adhesive layer 88 is located between the functional layer 42 and the display panel 50. The fifth adhesive member 88 adheres the functional layer 42 to the display panel 50. The fifth adhesive layer 88 may be a pressure sensitive adhesive (PSA) or a transparent adhesive layer, such as an optically clear adhesive (OCA).

The cover member 10 is disposed on the functional layer 42. The cover member 10 is adhered onto the functional layer 42 by a first adhesive member 81. In an embodiment, the first adhesive member 81 is a PSA or a transparent adhesive layer, such as an OCA.

In an embodiment, a protective film PFI is disposed under the display panel 50. The protective film PFI absorbs impacts received from the outside of the display device 1. For example, the protective film PFI includes an open area PFI-OP that corresponds to a bendable area of the display panel 50, as described below. A width of the open area PFI-OP is less than that of the bendable area of the display panel 50.

The panel protective member 41 is disposed under the protective film PFI. The panel protective member 41 is adhered to the lower portion of the protective film PFI via a PSA. However, embodiments are not necessarily limited thereto.

In an embodiment, a digitizer 70 is disposed under the display panel 50. The digitizer 70 includes a pattern layer that senses a signal received from an external electronic pen, etc. In particular, the digitizer 70 can sense an intensity, a direction, etc., of the signal received from the electronic pen, etc. The digitizer 70 is electrically connected to a main circuit board that is separately provided. However, embodiments are not necessarily limited thereto.

The digitizer 70 according to an embodiment include a first portion 70*a*, a second portion 70*b*, and a third portion 70*c*. In an embodiment, the first portion 70*a* of the digitizer 70 at least partially overlaps the first display area DA1, the second portion 70*b* of the digitizer 70 least partially overlaps the second display area DA2, and the third portion 70*c* of the digitizer 70 least partially overlaps the third display area DA3. In addition, the first portion 70*a* and the second portion 70*b* of the digitizer 70 at least partially overlap the first foldable area FA1, and the second portion 70*b* and the third portion 70*c* of the digitizer 70 at least partially overlap the second foldable area FA2.

In an embodiment, the first portion 70*a* and the second portion 70*b* of the digitizer 70 are spaced apart from each other in a first direction (x-direction) with the first folding axis FAX1 therebetween. In addition, the second portion 70*b* and the third portion 70*c* of the digitizer 70 are spaced apart from each other in the first direction (x-direction) with the second folding axis FAX2 therebetween. For example, the digitizer 70 has separate components, and is not an integrated component. Because the digitizer 70 has separate components, the generation of cracks in the digitizer 70 in the first folding area FA1 and the second folding area FA2 is prevented or reduced.

In an above example, the digitizer 70 is provided with separate components that at least partially overlap the first foldable area FA1 and the second foldable area FA2, and thus, the first foldable area FA1 and the second foldable area FA2 also receive a signal input, which can increase user convenience.

In an embodiment, a reinforcing member 60 is interposed between the display panel 50 and the digitizer 70. In an embodiment, the reinforcing member 60 is disposed under the display panel 50 and supports the display panel 50.

The reinforcing member 60 may have various structures, depending on whether the display device 1 is a folded or a folding type. For example, when the display device 1 is not folded, the reinforcing member 60 has a invariant shape.

The reinforcing member 60 includes a first reinforcing member layer 60-2 and a second reinforcing member layer 60-1. In embodiments, the first reinforcing member layer 60-2 and the second reinforcing member layer 60-1 are stacked with each other, or one of the first reinforcing member layer 60-2 and the second reinforcing member layer 60-1 are arranged inside the other.

The reinforcing member 60 includes a reinforcing member foldable area 60a, in which the first reinforcing member layer 60-2 is combined with the second reinforcing member layer 60-1. The reinforcing member foldable area 60a is arranged in at least a part of the reinforcing member 60.

In an embodiment, the reinforcing member foldable area 60a is arranged in a part of the reinforcing member 60 that is located in a portion of the display device 1 that is folded when the display device 1 is folded. In an embodiment, the reinforcing member foldable area 60a is disposed on the entire surface of the display device 1. Hereinafter, for convenience of description, an embodiment in which the reinforcing member foldable area 60a is arranged only in a portion of the reinforcing member 60 in which the display device 1 is bent will be described in detail.

In an embodiment, when folding the display device 1, the reinforcing member foldable area 60a is folded about the first folding axis FAX1 and the second folding axis FAX2. In an embodiment, opposite sides of the reinforcing member foldable area 60a are symmetrical with each other about the first folding axis FAX1 and the second folding axis FAX2. In an embodiment, the reinforcing member 60 has a flat upper surface.

In an embodiment, the reinforcing member 60 includes at least one of glass, plastic, or metal. In an embodiment, the reinforcing member 60 includes one of glass and plastic, glass and metal, plastic and metal, or glass, plastic, and metal.

Referring back to FIG. 1C, in an embodiment, the reinforcing member 60 is adhered to the panel protective member 41 by a second adhesive member 83. In an embodiment, the second adhesive member 83 is a PSA or a transparent adhesive member, such as an OCA film.

In an embodiment, the reinforcing member 60 and the digitizer 70 are adhered by a third adhesive member 85. In an embodiment, the third adhesive member 85 may include a PSA, an OCA film, or a thermoplastic polyurethane (TPU).

In an embodiment, the third adhesive member 85 is located under the reinforcing member 60.

In an embodiment, a cushion layer 80 is disposed under the digitizer 70. The cushion layer 80 includes a sticky material. In an embodiment, the cushion layer 80 prevents or reduces damage to the digitizer 70 disposed thereon due to external shock.

In an embodiment, an insulating film 89 is disposed under the cushion layer 80. Because the cushion layer 80 includes a sticky material, the cushion layer 80 can attach to another member and interfere with the folding of the display device 1. Therefore, because the insulating film 89 is attached to the lower portion of the cushion layer 80, the cushion layer 80 can be prevented from attaching to another member, so that the display device 1 can be easily folded.

In an embodiment, a fourth adhesive member 87 is disposed under the digitizer 70. In an embodiment, the fourth adhesive member 87 includes a PSA or an OCA film. However, embodiments are not necessarily limited thereto. In addition, in an embodiment, the digitizer 70 is connected to a main circuit board that is separately provided, by the fourth adhesive member 87. However, embodiments are not necessarily limited thereto.

The main circuit board may be provided separately from or integrally with the display circuit board 51. When the main circuit board and the display circuit board 51 are separately provided, the main circuit board and the display circuit board 51 may be connected to each other by a cable, etc. However, for convenience of description, an embodiment in which the main circuit board is separately provided from the display circuit board 51 is described in detail below.

The main circuit board includes a main processor, a camera device, a main connector, and components. The main processor includes an integrated circuit. The camera device is disposed on both an upper surface and a lower surface of the main circuit board, and each of the main processor and the main connector are disposed on one of the upper or lower surfaces of the main circuit board.

The main processor controls all functions of the display device 1. For example, the main processor outputs digital video data to the display driver 52 through the display circuit board 51, such that the display panel 50 can display an image. In addition, the main processor receives sensing data from the touch sensor driver 53. The main processor determines whether there is a user's touch according to the sensing data, and performs an operation corresponding to a direct touch or a proximate touch by the user. For example, the main processor calculates a touch coordinate of the user by analyzing the sensing data, and executes an application or performs an operation indicated by an icon touched by the user. The main processor may be one of an application processor, a central processing unit, or a system chip that includes an integrated circuit.

The camera device processes image frames of a still image or a moving picture obtained by an image sensor in a camera mode, and outputs the processed result to the main processor. The camera device includes at least one of a camera sensor, such as a CCD, a CMOS, etc., a photo or image sensor, or a laser sensor. The camera device is connected to the image sensor and processes the image input to the image sensor.

A cable passes through a cable hole of a bracket and is connected to the main connector, and thus, the main circuit board is electrically connected to the display circuit board 51.

The main circuit board further includes, in addition to the main processor, the camera device, and the main connector, at least one wireless communication unit, at least one input unit, at least one sensor unit, at least one output unit, at least one interface unit, a memory, and a power supplier.

The wireless communication unit includes at least one of a broadcast receiving module, a mobile communication module, a near field communication module, or a position information module.

The broadcast receiving module receives a broadcast signal and/or broadcast-related information from an external broadcast management server through a broadcast channel. The broadcast channel includes satellite channels and terrestrial channels.

The mobile communication module transmits/receives a wireless signal to/from at least one of a base station, an external terminal, or a server on a mobile communication network established according to technology standards or communication methods for mobile communication, such as global system for mobile communication (GSM), code division multi access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LED-A), etc. The wireless signal may be a voice call signal, a video call signal, or various types of data according to transmission/reception of texts/multimedia messages.

A wireless Internet module is a module that accesses wireless Internet. The wireless Internet module can transmit/receive a wireless signal in a communication network according to wireless Internet technologies. The wireless Internet technology may be, for example, wireless LAN (WLAN), wireless-fidelity (Wi-Fi), Wi-Fi direct, digital living network alliance (DLNA), etc.

A short-range communication module supports short-range communication by using at least one of Bluetooth™, Radio Frequency Identification (RFID), Infrared Data Association (IrDA), Ultra Wideband (UWB), ZigBee, Near Field Communication (NFC), Wi-Fi, Wi-Fi Direct, or Wireless Universal Serial Bus (USB). The short-range communication module supports wireless communication between the display device 1 and a wireless communication system, between the display device 1 and another electronic device, or between the display device 1 and a network in which another electronic device or an external server is located through wireless area networks. The wireless area network may include a wireless personal area network. Another electronic device may include a wearable device that can exchange data with the display device 1.

The position information module obtains a location of the display device 1, and examples of the position information module include a global positioning system (GPS) module or a Wi-Fi module. For example, when using a GPS module, the display device 1 obtains the location of the display device 1 by using a signal provided from a GPS satellite. In addition, when using a Wi-Fi module, the display device 1 can obtain the location of the display device 1, based on information of a wireless access point (AP) that transmits or receives a wireless signal to/from the Wi-Fi module. The position information module obtains the location of the display device 1 and not necessarily limited to a module that directly calculates or obtains the location of the display device 1.

The input unit includes an image input unit, such as the camera device, that receives image signals, a sound input unit, such as a microphone, that receives sound signals, and an input device that receives information from a user.

The camera device process image frames, such as still images, moving pictures, etc., obtained by the image sensor in a video call mode or a photographing mode. The processed image frame can be displayed on the display panel 50 or stored in the memory.

The microphone processes a sound signal received from outside as electrical voice data. The voice data can be variously used according to the function performed by the display device 1, or the application being executed. The microphone uses various noise canceling algorithms that cancel noise generated when receiving the sound signal from the outside.

The main processor controls operations of the display device 1 so as to correspond to information received from the input device. The input device may include a mechanical input unit, such as a button located on a rear surface or a side surface of the display device 1, a dome switch, a jog-wheel, a jog switch, etc., or a touch input unit. The touch input unit includes a touchscreen layer of the display panel 50.

The sensor unit includes one or more sensors that sense at least one of information in the display device 1, peripheral environment information of the display device 1, or user information, and generate a sensing signal corresponding to the sensed information. The main processor controls driving or operation of the display device 1, processes data, or perform functions or operations regarding an application installed on the display device 1, based on the sensing signal. The sensor unit includes at least one of a proximity sensor, an illumination sensor, an acceleration sensor, a magnetic sensor, a G-sensor, a gyroscope sensor, a motion sensor, an RGB sensor, an infrared ray (IR) sensor, a finger scan sensor, an ultrasonic sensor, an optical sensor, a battery gauge, an environmental sensor, such as a barometer, a hydrometer, a thermometer, a radiation detection sensor, a heat detection sensor, a gas detection sensor, etc., or a chemical sensor, such as an electronic nose, a healthcare sensor, a biometric sensor, etc.

The proximity sensor senses a presence of an object that is approaching a predetermined detection surface or an object around the detection surface by using an electromagnetic field or a infrared light, without a physical contact. Examples of a proximity sensor include a transmission-type photoelectric sensor, a direct reflective photoelectric sensor, a mirror reflective photoelectric sensor, a radio frequency oscillation-type proximity sensor, a capacitive-type proximity sensor, a magnetic-type proximity sensor, an infrared proximity sensor, etc. The proximity sensor senses a proximity touch pattern, such as a proximity touch distance, a proximity touch direction, a proximity touch speed, a proximity touch time, a proximity touch position, and/or a proximity touch movement, etc., as well as the proximity touch. The main processor processes data or information that corresponds to the proximate touch operation or the proximate touch pattern sensed by the proximity sensor, and controls visual information that corresponds to processed data to be displayed on the display panel 50.

The ultrasonic sensor recognizes position information of an object. The main processor calculates a position of an object through information sensed by the optical sensor and a plurality of ultrasonic sensors. Because the speed of light and the speed of ultrasonic waves differ from each other, the position of an object is calculated by using a time taken for the light to reach the optical sensor and a time for the ultrasonic wave to reach the ultrasound sensor.

The output unit generates an output related to a visual, auditory, or tactile sense, and includes at least one of the display panel 50, a sound output unit, a haptic module, or an optical output unit.

The sound output unit outputs sound data received from the wireless communication unit or stored in the memory in a call signal reception, a call mode or a recording mode, a voice recognition mode, a broadcast reception mode, etc. The sound output unit outputs a sound signal related to the function executed on the display device 1, such as a call signal reception sound, a message reception sound, etc The sound output unit includes a receiver and a speaker. At least one of the receiver or the speaker is a sound generation device that is attached to a lower portion of the display panel 50 to vibrate the display panel 50 and output sound. The sound generation device includes a piezoelectric element or a piezoelectric actuator that contracts and expands according to an electric signal, or an exciter that generates a magnetic force by using a voice coil to vibrate the display panel 50.

The haptic module generates various tactile effects that a user can feel. The haptic module provides the user with a vibration as the tactile effect. An intensity and pattern of the vibrations generated by the haptic module are controlled by a selection of the user or a setting of the main processor. For example, the haptic module synthesizes and outputs different vibrations or sequentially outputs the different vibrations. The haptic module can generate various tactile effects, such as an arrangement of pins that move vertically to contact the skin surface, an air injection force or an air suction force through an injection port or a suction port, a grazing on the skin surface, a contact of an electrode, effects caused by stimulation of an electromagnetic force, or effects caused by producing a cooling and warming feeling by using endothermic or exothermic elements. The haptic module can be implemented such that the user can feel the tactile effect through muscle sensation, such as a finger, an arm, etc., as well as through direct contact.

The optical output unit outputs a signal that notifies an occurrence of an event by using light from a light source. Examples of an event occurring on the display device 1 include a message reception, a call signal reception, a missed call, an alarm, a schedule notification, an email reception, an information reception through an application, etc. The signal output from the optical output unit occurs when the display device 1 emits light of a single color or a plurality of colors through a front surface or a rear surface thereof. The signal output terminates when the display device 1 senses that the user identifies the event.

The interface unit is a path to various external devices connected to the display device 1. The interface unit includes at least one of a wired/wireless headset port, an external charger port, a wired/wireless data port, a memory card port, a port that connects a device that includes an identification module, an audio input/output (I/O) port, a video I/O port, or an earphones port. The display device 1 performs an appropriate control regarding an external device connected thereto, in response to the connection of the external device to the interface unit.

The memory stores data that supports various functions of the display device 1. The memory stores a plurality of application programs executed by the display device 1, data for operating the display device 1, and instructions. At least some of the plurality of application programs are downloaded from an external server through wireless communication. The memory stores an application for operating the main processor and can temporarily store input/output data, such as data such as a phone book, messages, still images, videos, etc. In addition, the memory can store haptic data for various vibration patterns provided to the haptic module and sound data provided to the sound output unit. The memory includes at least one of a flash memory type, a hard disk type, a solid state disk (SSD) type, a silicon disk drive (SSD) type, a multimedia card micro type, a card type, such as SD or XD memory, etc., a random access memory (RAM), a static RAM (SRAM), a read-only memory (ROM), an electrically erasable programmable ROM (EEPROM), a programmable ROM (PROM), a magnetic memory, a magnetic disk, or an optical disk.

The power supplier supplies electric power to each of elements in the display device 1 by receiving external and internal power under control of the main processor. The power supplier may include a battery. In addition, the power supplier includes a connection port, and the connection port may be an example of the interface unit to which an external charger that supplies the electric power that charges the battery is electrically connected. In an embodiment, the power supplier wirelessly charges the battery without using the connection port. The battery receives the electric power from an external wireless power transfer device by at least one of an inductive coupling method based on a magnetic induction phenomenon, or a magnetic resonance coupling method based on an electromagnetic resonance phenomenon. The battery does not overlap the main circuit board in a third direction (Z-direction). The battery overlaps a battery hole of the bracket.

The lower cover 90 is disposed under the main circuit board and the battery. The lower cover 90 is coupled and fixed to the bracket. The lower cover 90 configures a lower outer appearance of the display device 1. The lower cover 90 includes at least one of plastic, metal, or both plastic and metal.

Therefore, the display device 1 prevents the end of the cover member 10 from becoming separated therefrom. In addition, because there is no space between the functional layer 42 and the bending protective layer BPL in the display device 1, foreign matter that may be introduced through the space, static electricity, etc. can be prevented. In the display device 1, the bending protective layer BPL is accurately arranged so as to prevent damage to the substrate 100 when bending the substrate 100 of the display panel 50.

Figure 1D:
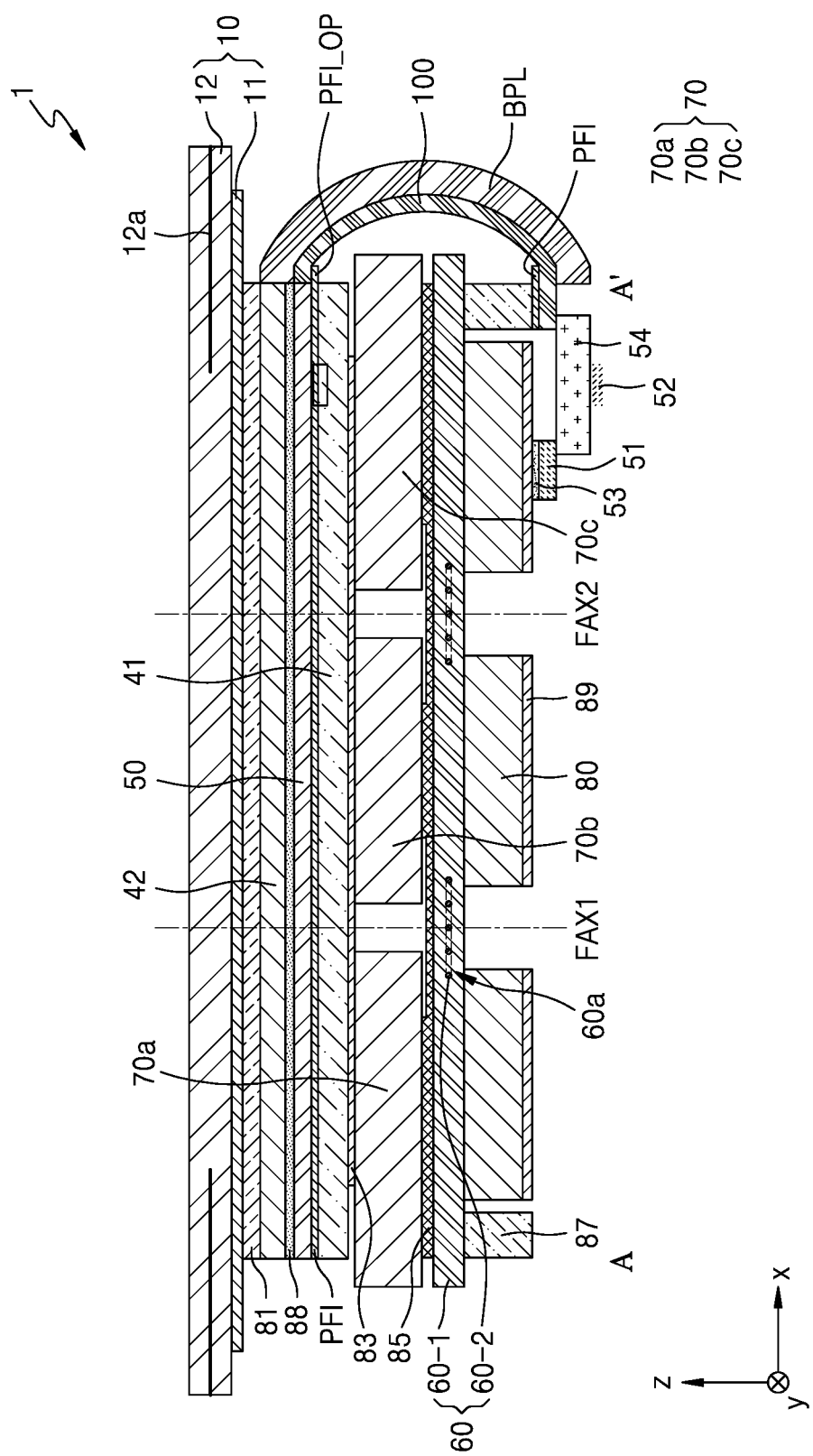
FIG. 1D is a cross-sectional view of a display device of FIG. 1A taken along line A-A'.

FIG. 1D is a cross-sectional view of the display device 1 of FIG. 1A taken along line A-A'.

Referring to FIG. 1D, in an embodiment, the display device 1 includes the cover member 10, the panel protective member 41, the functional layer 42, the display panel 50, the protective film PFI, the reinforcing member 60, the digitizer 70, the cushion layer 80, the insulating film 89, and the lower cover 90. Here, the cover member 10, the panel protective member 41, the functional layer 42, the display panel 50, the protective film PFI, the reinforcing member 60, the digitizer 70, the cushion layer 80, the insulating film 89, and the lower cover 90 are the same as or similar to those described above with reference to FIGS. 1A to 1C.

The digitizer 70 is disposed under the display panel 50 and above the reinforcing member 60. The digitizer 70 includes the first portion 70a, the second portion 70b, and the third portion 70c as described above with reference to FIG. 1C.

In addition, an additional barrier film is interposed between the display panel 50 and the reinforcing member 60 of FIG. 1C or between the display panel 50 and the digitizer 70 of FIG. 1D. The barrier film is disposed on the rear surface of the display panel 50 and prevents scratches, etc., that can occur while manufacturing the display panel 50. The barrier film includes a colored polyimide film. For example, the barrier film includes an opaque yellow film, but is not necessarily limited thereto.

Figure 2A:
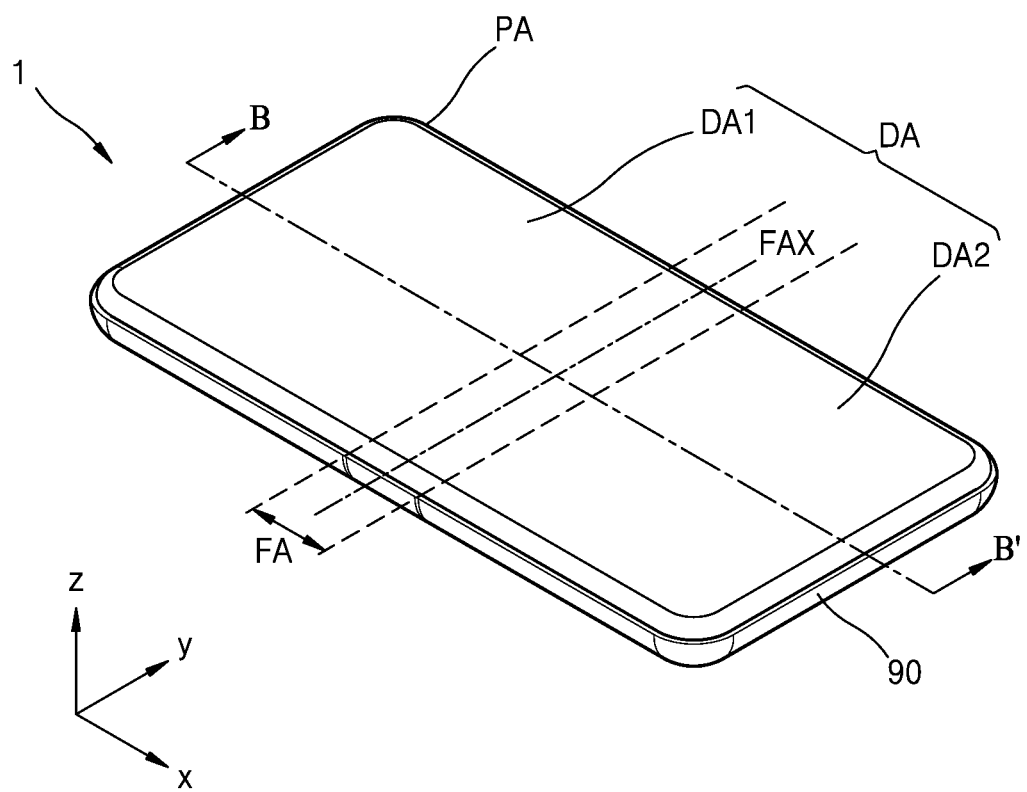
FIG. 2A is a perspective view of a display device according to an embodiment of the disclosure.
Figure 2B:
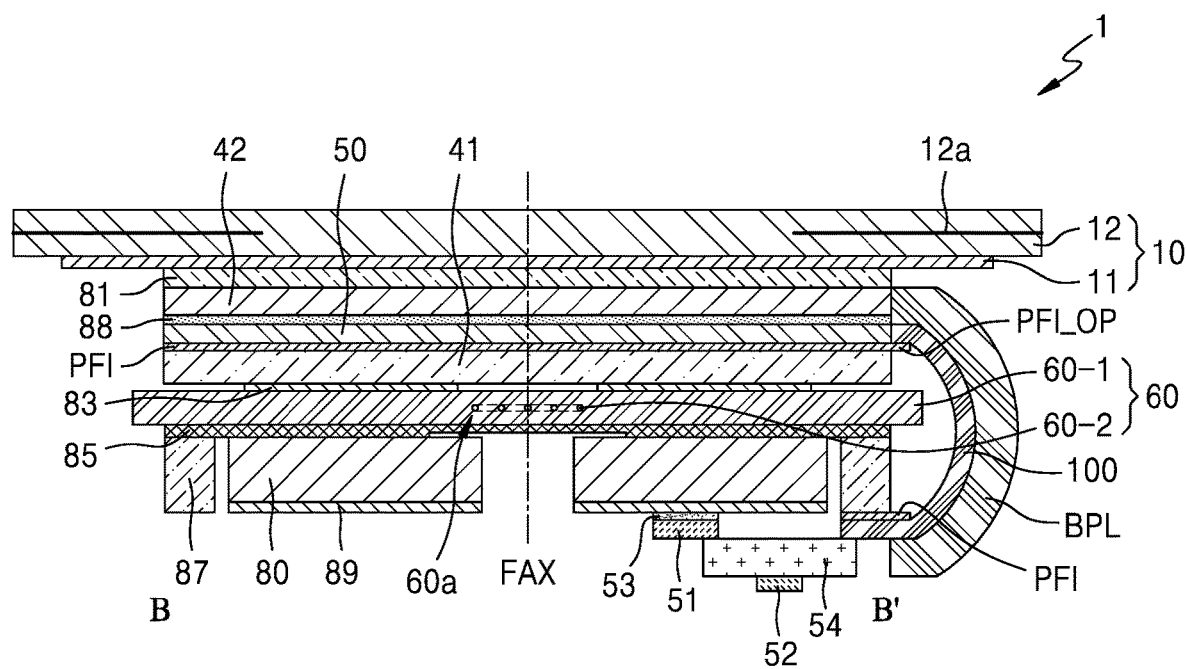
FIG. 2B is a cross-sectional view of a display device of FIG. 2A taken along line B-B'

FIG. 2A is a perspective view of the display device 1 according to an embodiment of the disclosure. FIG. 2B is a cross-sectional view of the display device 1 of FIG. 2A taken along line B-B'.

Referring to FIGS. 2A and 2B, in an embodiment, the display device 1 includes the display area DA, and the peripheral area PA around the display area DA. In an embodiment, the display device 1 includes a foldable area FA, and the display area DA includes a first display area DA1 and a second display area DA2 that are spaced apart from each other with the foldable area FA therebetween. The display area DA, the foldable area FA, and the peripheral area PA are similar to or the same as those described in FIG. 1A, and detailed descriptions thereof are omitted.

In an embodiment, the display device 1 includes the cover member 10, the panel protective member 41, the functional layer 42, the display panel 50, the protective film PFI, the reinforcing member 60, the cushion layer 80, the insulating film 89, and the lower cover 90. The cover member 10, the panel protective member 41, the display panel 50, the protective film PFI, the reinforcing member 60, the cushion layer 80, the insulating film 89, and the lower cover 90 are the same as or similar to those described above with reference to FIGS. 1A to 1C.

The functional layer 42 is disposed on the touchscreen layer. The functional layer 42 includes an anti-reflection layer. The anti-reflection layer reduces a reflectivity of external light incident through the display device 1.

In some embodiments, the anti-reflection layer includes a polarization film. The polarization film includes a linear polarization plate and a phase retardation film, such as a λ/4 (quarter-wave) plate. The phase retardation film is disposed on the touchscreen layer, and the linear polarization plate is disposed on the phase retardation film.

In an embodiment, the anti-reflection layer includes a destructive interference structure. The destructive interference structure includes a first reflective layer and a second reflective layer arranged on different layers. First reflected light and second reflected light that are respectively reflected by the first reflective layer and the second reflective layer destructively interfere with each other, which reduces reflectivity of external light.

A first adhesive member 81 is arranged between the cover member 10 and the functional layer 42, and a fifth adhesive member 88 is arranged between the functional layer 42 and the display panel 50. A third adhesive member 85 is arranged between the reinforcing member 60 and the cushion layer 80, and a fourth adhesive member 87 is disposed under the third adhesive member 85.

Hereinafter, "upper portion" denotes a direction in which the cover member 10 is located based on the display panel 50, that is, +z direction, and "lower portion" denotes a direction in which the cushion layer 80 is located based on the display panel 50, that is, −z direction.

In an embodiment, the display device 1 has a rectangular shape on a plane. For example, the display device 1 has a rectangular planar shape that has longer sides in the first direction (x-direction) and shorter sides in the second direction (y-direction) that crosses the first direction (x-direction), as shown in FIG. 2A. A corner where the longer side in the first direction (x-direction) and the shorter side in the second direction (y-direction) meet each other may be rounded with a predetermined curvature or may be right-angled. The planar shape of the display device 1 is not necessarily limited to a rectangular shape, and may have other planar shapes, such as a polygonal shape, an elliptical shape, or an undefined shape.

In an embodiment, the display device 1 has various shapes. For example, the display device 1 has a shape that does not vary. In an embodiment, the display device 1 may be at least partially folded. The display device 1 may be an in-folding type in which the display area DA is folded to face each other when the display device 1 is folded, or an out-folding type in which the display area DA is exposed to outside when the display device 1 is folded. Hereinafter, for convenience of description, an example in which the display device 1 is an in-folding type will be described below.

In an embodiment, the display device 1 is folded based about a folding axis FAX. In this case, when the display device 1 is folded based on (or about) the folding axis FAX, the size of the display device 1 may reduce as compared with that when the display device 1 is completely unfolded.

Therefore, when the display device 1 is completely folded, a large display screen may be implemented, and when the display device 1 is completely folded, the size of the display device 1 is reduced and results in improving the portability of the display device 1.

Figure 3:
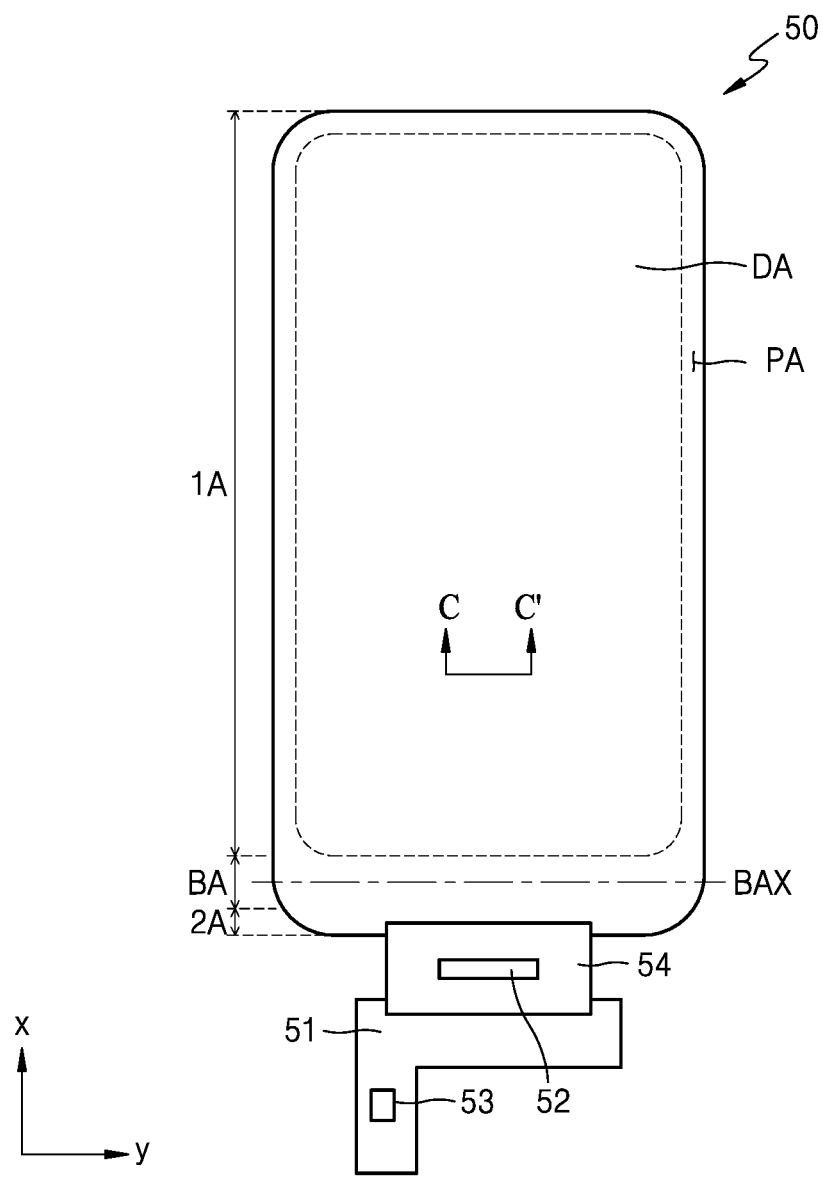
FIG. 3 is a plan view of a display panel of a display device of FIG. 1A or FIG. 2A.

FIG. 3 is a plan view of the display panel 50 of the display device 1 of FIG. 1A or FIG. 2A.

Referring to FIG. 3, in an embodiment, the display panel 50 is disposed under the cover member 10. In an embodiment, the display panel 50 of the display device 1 includes the display area DA and the peripheral area PA. Therefore, display elements are arranged in the display area DA of the display panel 50 to display images, and no display elements are arranged in the peripheral area PA of the display panel 50, so that images are not displayed.

The display panel 50 as above includes a first area 1A, a bendable area BA, and a second area 2A. The first area 1A includes the display area DA and a part of the peripheral area PA adjacent to the display area DA, the bendable area BA includes a bending axis BAX that is arranged in the peripheral area PA, and the second area 2A is connected to the bendable area BA and is in the peripheral area PA so that terminals can be arranged therein. The first area 1A can be maintained flat or folded.

In an embodiment, the display panel 50 includes display elements. The display elements include light-emitting display panels that include light emitting diodes. In an embodiment, the display panel 50 is one of an organic light-emitting display panel that uses an organic light-emitting diode that includes an organic light-emitting layer, a micro-LED display panel that uses a micro-LED, a quantum dot light-emitting display panel that uses a quantum dot light-emitting diode that includes a quantum dot light-emitting layer, or an inorganic light-emitting display panel that uses an inorganic light-emitting device that includes an inorganic semiconductor.

In an embodiment, the display panel 50 may be a rigid display panel that is not easily bent, or a flexible display panel that is flexible and can be easily bent, folded, or rolled. For example, the display panel 50 is one of a foldable display panel, a curved display panel that has a curved display surface, a bendable display panel that has a bendable region other than the display surface, a rollable display panel that is rollable and spreadable, or a stretchable display panel.

The display panel 50 is transparent so that an object or background under the display panel 50 can be seen from above the display panel 50. In an embodiment, the display panel 50 includes a reflective display panel that reflects an object or background above the display panel 50.

In an embodiment, a first flexible film 54 is attached to one edge of the display panel 50. A side of the first flexible film 54 is attached to one edge of the display panel 50 via an anisotropic conductive film. The first flexible film 54 can be bent.

In an embodiment, the display driver 52 is disposed on the first flexible film 54. The display driver 52 receives control signals and power voltages, and generates and outputs signals and voltages that drive the display panel 50. The display driver 52 includes an integrated circuit (IC).

In an embodiment, the display circuit board 51 is attached to the other side of the first flexible film 54. The opposite side of the first flexible film 54 is attached to an upper surface of the display circuit board 51. The display circuit board 51 is one of a flexible printed circuit board (FPCB) that is bendable, a rigid printed circuit board (PCB) that is hard and rarely bendable, or a composite printed circuit board that includes both the rigid PCB and the FPCB.

In an embodiment, a touch sensor driver 53 is disposed on the display circuit board 51. The touch sensor driver 53 may include an integrated circuit. The touch sensor driver 53 is attached onto the display circuit board 51. The touch sensor driver 53 is electrically connected to touch electrodes in the touchscreen layer of the display panel 50 through the display circuit board 51.

The touchscreen layer of the display panel 50 can sense a user's touch input by using at least one of various touch methods, such as a resistive overlay method, a capacitive overlay method, etc. For example, when the touchscreen layer of the display panel 50 senses a user's touch input in a capacitive overlay method, the touch sensor driver 53 transmits driving signals to driving electrodes of the touch electrodes and senses voltages charged in mutual capacitance between the driving electrodes and sensing electrodes by using the sensing electrodes of the touch electrodes to determine whether a user's touch has occurred. The user's touch may include a touch and a proximity touch. The touch may be that of a user's finger or an object such as a pen that directly contacts the cover member 10 on the touchscreen layer. The proximity touch may be that a user's finger or an object such as a pen is close to the cover member 10, but not in direct contact with the cover member 10, e.g., hovering. The touch sensor driver 53 transmits sensor data to the main processor according to sensed voltages, and the main processor analyzes the sensor data and calculates a touch coordinate of the touch input.

A power supply that supplies driving voltages that drive sub-pixels, a scan driver, and the display driver 52 of the display panel 50 is additionally disposed on the display circuit board 51. In an embodiment, the power supplier is integrated with the display driver 52, and the display driver 52 and the power supplier are provided as one integrated circuit.

Figure 4A:
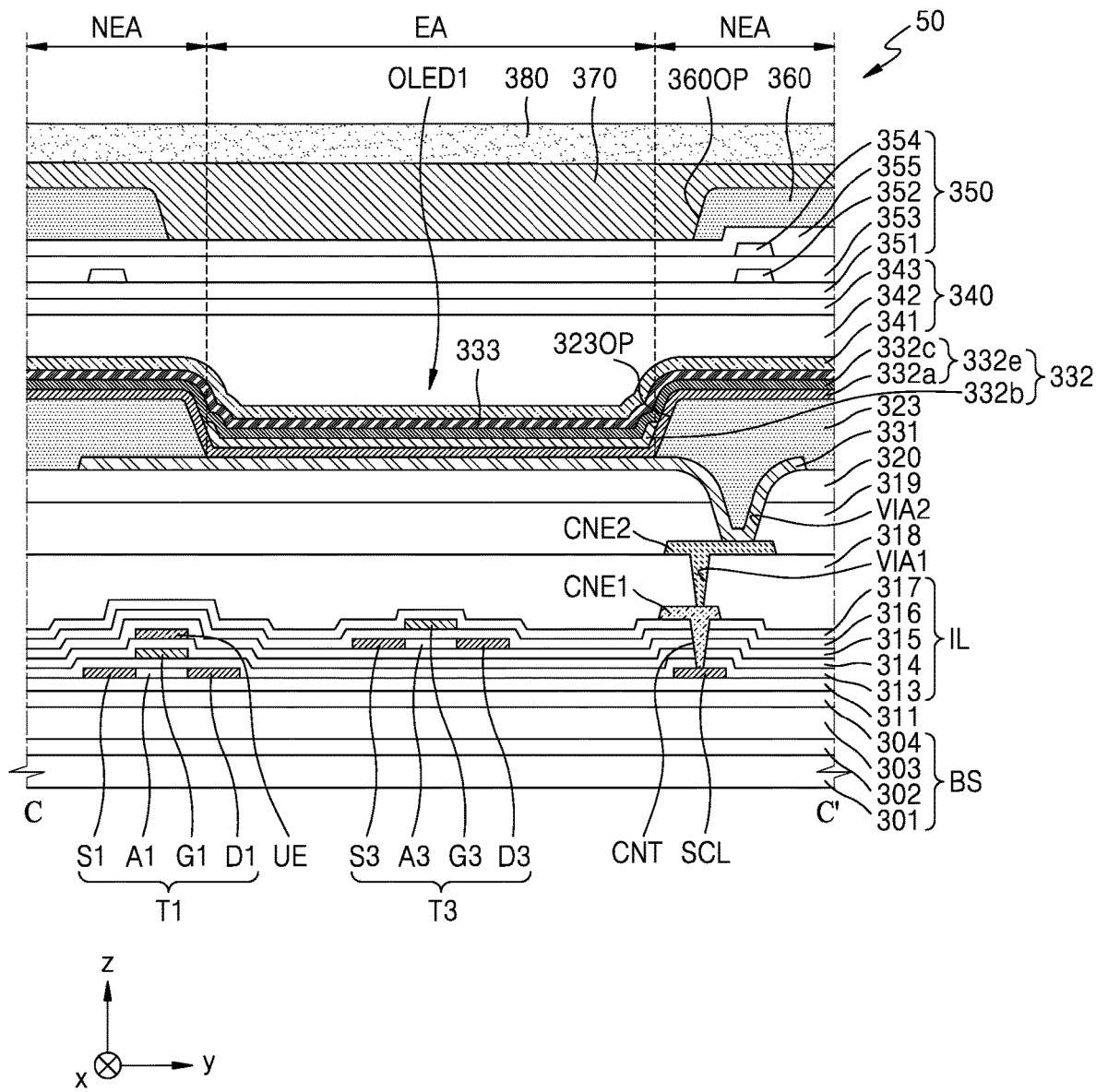
FIGS. 4A and 4B are cross-sectional views of a display panel of FIG. 3 taken along line C-C'.
Figure 4B:
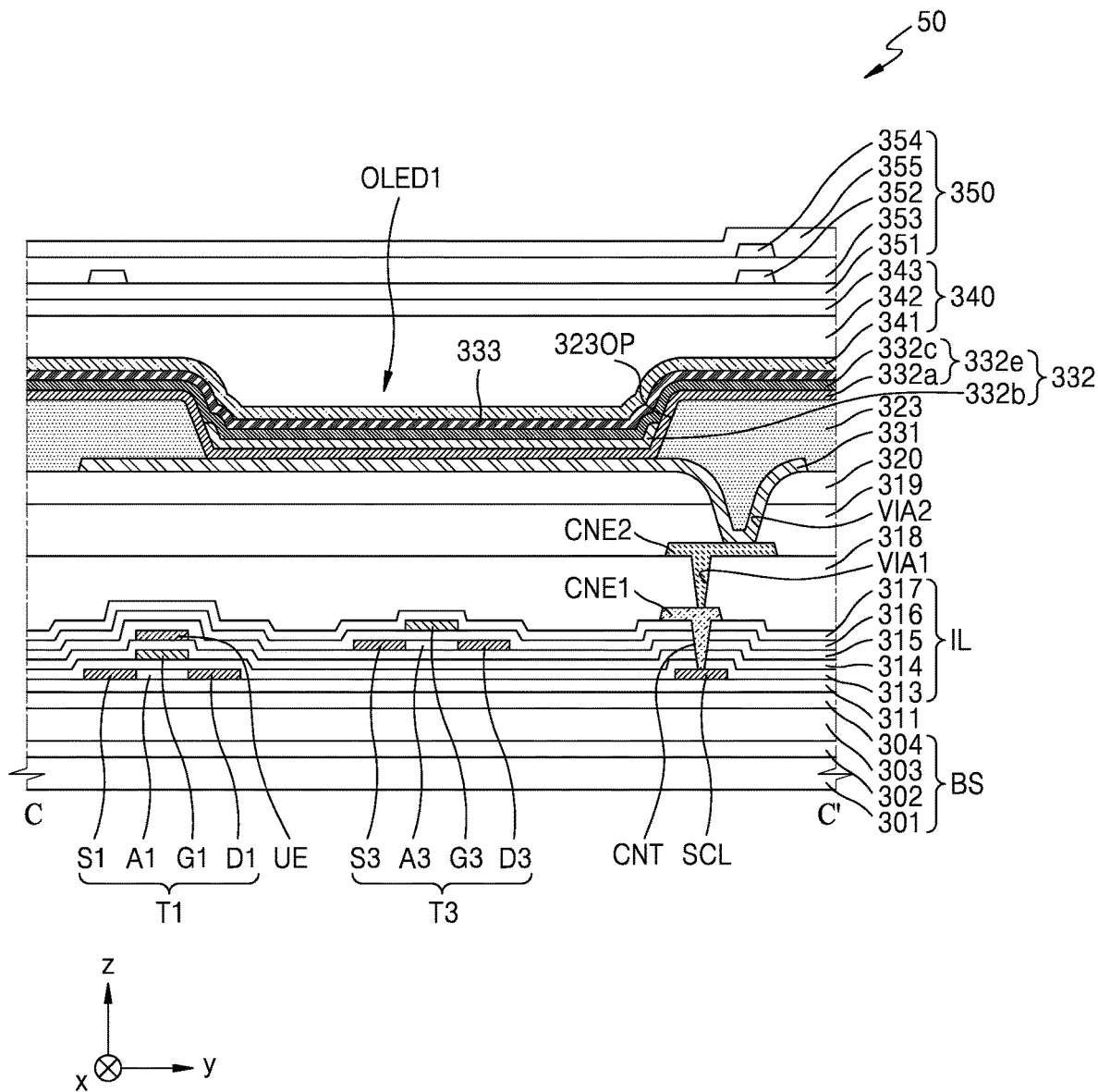

FIGS. 4A and 4B are cross-sectional views of the display panel 50 of FIG. 3 taken along line C-C'. FIGS. 4A and 4B show a first transistor T1 and a third transistor T3 of first to seventh transistors T1 to T7 of FIG. 5 that will be described below.

Referring to FIG. 4A, in an embodiment, the display panel 50 includes a substrate BS, a buffer layer 311, insulating layers IL, a light-emitting device OLED1, a thin film encapsulation layer 340, an input sensor 350, a black matrix 360, a color filter 370, and an overcoat layer 380.

The substrate BS has a structure in which an organic layer and an inorganic layer are alternately stacked. For example, the substrate BS includes a first base layer 301, a first barrier layer 302, a second base layer 303, and a second barrier layer 304 which are sequentially stacked.

The first base layer 301 includes an organic material. For example, the first base layer 301 includes one of polyimide, polyethylene naphthalate, polyethylene terephthalate, polyarylate, polycarbonate, polyether imide, or polyether sulfone.

The first barrier layer 302 is disposed on the first base layer 301. The first barrier layer 302 includes an inorganic material. For example, the first barrier 302 includes at least one of silicon oxide, silicon oxynitride, silicon nitride, amorphous silicon, etc. In an embodiment, the first barrier layer 302 includes a first layer and a second layer, and the second layer has a refractive index that is less than that of the first layer. For example, the first layer includes silicon oxynitride, and the second layer includes silicon oxide, which has a lesser refractive index than the silicon oxynitride.

The second base layer 303 is disposed on the first barrier layer 302. The second base layer 303 includes the same material as the first base layer 301. However, embodiments are not necessarily limited thereto. In an embodiment, the second base layer 303 includes a different material from the first base layer 301. In an embodiment, a thickness of the second base layer 303 is less than that of the first base layer 301.

The second barrier layer 304 is disposed on the second base layer 303. The second barrier layer 304 includes an inorganic material. For example, the second barrier layer 304 includes at least one of silicon oxide, silicon oxynitride, silicon nitride, etc. In an embodiment, the second barrier layer 304 includes a first layer and a second layer, and the second layer has a refractive index that is less than that of the first layer. For example, the first layer includes silicon oxynitride, and the second layer includes silicon oxide, which has a lesser refractive index than the silicon oxynitride.

The buffer layer 311 is disposed on the substrate BS. The buffer layer 311 reduces or blocks infiltration of foreign substances, moisture, or external air from the lower portion of the substrate BS. The buffer layer 311 includes an inorganic material such as silicon oxide, silicon oxynitride, or silicon nitride, and may have a single-layered or a multi-layered structure that includes the above-stated materials.

A semiconductor pattern is disposed on the buffer layer 311. Hereinafter, the semiconductor pattern directly disposed on the buffer layer 311 is referred to as a first semiconductor pattern. The first semiconductor pattern includes a silicon semiconductor. In an embodiment, the first semiconductor pattern includes polysilicon. However, embodiments are not necessarily limited thereto. In an embodiment, the first semiconductor pattern includes amorphous silicon.

FIG. 4A shows a part of the first semiconductor pattern, and another first semiconductor pattern is further arranged in another region of the pixel PX. The first semiconductor pattern includes a doping area and a non-doping area. The doping area is doped with an N-type dopant or a P-type dopant. A P-type transistor includes a P-type dopant doped in the doping area.

A first transistor T1 includes a source S1, an active region A1, and a drain D1. The source S1, the active region A1, and the drain D1 of the first transistor T1 are formed from the first semiconductor pattern. The source S1 and the drain D1 of the first transistor T1 are spaced apart from each other with the active region A1 of the first transistor T1 therebetween.

A connecting signal line SCL is further disposed on the buffer layer 311. The connecting signal line SCL is connected to a drain D6 of a sixth trace line T6 (see FIG. 5) on a plane. However, in an embodiment, the connecting signal line SCL is omitted.

A first insulating layer 313 of the insulating layers IL is disposed on the buffer layer 311. The first insulating layer 313 covers the first semiconductor pattern. In an embodiment, the first insulating layer 313 includes an inorganic material such as silicon oxide, silicon oxynitride, or silicon nitride, and may have a single-layered or a multi-layered structure that includes the above stated materials.

A gate G1 of the first transistor T1 is disposed on the first insulating layer 313. The gate G1 is a part of a metal pattern. The gate G1 of the first transistor T1 at least partially overlaps the first semiconductor pattern disposed thereunder. For example, the gate G1 overlaps the active region A1 disposed thereunder. The gate G1 may have a single-layered or a multi-layered structure that includes a low-resistive conductive material such as molybdenum (Mo), aluminum (Al), copper (Cu), and/or titanium (Ti).

A second insulating layer 314 of the insulating layers IL is disposed on the first insulating layer 313. The second insulating layer 314 covers the gate G1 of the first transistor T1. The second insulating layer 314 includes an inorganic material such as silicon oxide, silicon oxynitride, or silicon nitride, and may have a single-layered or a multi-layered structure including the above stated materials.

An upper electrode UE is disposed on the second insulating layer 314. The upper electrode UE at least partially overlaps the gate G1 of the first transistor T1 disposed thereunder. The upper electrode UE is a part of a metal pattern or a doped semiconductor pattern. A part of the gate G1 and the upper electrode UE that overlap the gate G1 form a first storage capacitor Cst (see FIG. 5). However, in an embodiment, the upper electrode UE is omitted.

In addition, a first electrode CE1 (see FIG. 5) and a second electrode CE2 (see FIG. 5) of the first storage capacitor Cst (see FIG. 5) are manufactured respectively through the same processes as the gate G1 and the upper electrode UE. The first electrode CE1 is disposed on the first insulating layer 313, and the first electrode CE1 is electrically connected to the gate G1. The first electrode CE1 may be integrally formed with the first gate G1.

A third insulating layer 315 of the insulating layers IL is disposed on the second insulating layer 314. The third insulating layer 315 covers the upper electrode UE. The third insulating layer 315 includes an inorganic material such as silicon oxide, silicon oxynitride, or silicon nitride, and may have a single-layered or a multi-layered structure that includes the above stated materials. In an embodiment, the third insulating layer 314 includes a plurality of silicon oxide layers and silicon nitride layers that are alternately stacked with each other.

In addition, sources S2, S5, S6, and S7 (see FIG. 5), drains D2, D5, D6, and D7 (see FIG. 5), and gates G2, G5, G6, and G7 (see FIG. 5) of second, fifth, sixth, and seventh transistors T2, T5, T6, and T7 (see FIG. 5) are manufactured respectively through the same processes as the source S1, the drain D1, and the gate G1 of the first transistor T1.

A semiconductor pattern is disposed on the third insulating layer 315. Hereinafter, the semiconductor pattern directly disposed on the third insulating layer 315 will be referred to as a second semiconductor pattern. The second semiconductor pattern includes an oxide semiconductor. The oxide semiconductor includes a crystalline or an amorphous oxide semiconductor.

For example, the oxide semiconductor is at least one of indium (In), gallium (Ga), stannum (Sn), zirconium (Zr), vanadium (V), hafnium (Hf), cadmium (Cd), germanium (Ge), chromium (Cr), titanium (Ti), or zinc (Zn). In addition, the oxide semiconductor includes at least one of indium-tin oxide (ITO), indium-gallium-zinc oxide (IGZO), zinc oxide (ZnO), indium-zinc oxide (IZnO), zinc-indium oxide (ZIO), indium oxide (InO), titanium oxide (TiO), indium-zinc-tin oxide (IZTO), zinc-tin oxide (ZTO), etc.

A third transistor T3 includes a source S3, an active region A3, and a drain D3. The source S3, the active region A3, and the drain D3 of the third transistor T3 are formed from the second semiconductor pattern. The source S3 and the drain D3 of the third transistor T3 include a metal reduced from a metal oxide semiconductor. The source S3 and the drain D3 of the third transistor T3 each include a metal layer that includes the reduced metal.

A fourth insulating layer 316 of the insulating layers IL is disposed on the third insulating layer 315. The fourth insulating layer 316 covers the second semiconductor pattern. In an embodiment, the fourth insulating layer 316 includes an inorganic material such as silicon oxide, silicon oxynitride, or silicon nitride, and may have a single-layered or a multi-layered structure including the above stated materials.

In an embodiment, the fourth insulating layer 316 is patterned to correspond to a gate G3 of the third transistor T3 to be disposed thereon. That is, the gate G3 and the fourth insulating layer 316 have the same shape on a plane.

The gate G3 of the third transistor T3 is disposed on the fourth insulating layer 316. The gate G3 is a part of a metal pattern. The gate G3 of the third transistor T3 at least partially overlaps the second semiconductor pattern disposed thereunder. For example, the gate G3 overlaps the active region A3 disposed thereunder. The gate G3 may have a single-layered or a multi-layered structure that includes a low-resistive conductive material such as molybdenum (Mo), aluminum (Al), copper (Cu), and/or titanium (Ti).

A fifth insulating layer 317 of the insulating layers IL is disposed on the fourth insulating layer 316. The fifth insulating layer 317 covers the gate G3. In an embodiment, the fifth insulating layer 317 includes an inorganic material such as silicon oxide, silicon oxynitride, or silicon nitride, and may have a single-layered or a multi-layered structure that includes the above stated materials. In an embodiment, the fifth insulating layer 317 includes a plurality of silicon oxide layers and silicon nitride layers that are alternately stacked with each other.

In addition, a source S4 (see FIG. 5), a drain D4 (see FIG. 5), and a gate G4 (see FIG. 5) of the fourth transistor T4 (see FIG. 5) are manufactured respectively through the same processes as the source S3, the drain D3, and the gate G3 of the third transistor T3.

The first insulating layer 313 to the fifth insulating layer 317 are referred to as the insulating layers IL. However, in an embodiment, at least one of the first insulating layer 313 to the fifth insulating layer 317 is omitted.

At least one organic insulating layer is disposed on the fifth insulating layer 317. In an embodiment, a first organic insulating layer 318, a second organic insulating layer 319, and a third organic insulating layer 320 are disposed on the fifth insulating layer 317. Each of the first organic insulating layer 318, the second organic insulating layer 319, and the third organic insulating layer 320 is a single-layered polyimide-based resin layer. However, embodiments are not necessarily limited thereto. In an embodiment, each of the first organic insulating layer 318, the second organic insulating layer 319, and the third organic insulating layer 320 includes at least one of an acryl-based resin, a methacrylic-based resin, polyisoprene, a vinyl-based resin, an epoxy-based resin, an urethane-based resin, a cellulose-based resin, a siloxane-based resin, a polyamide-based resin, or a perylene-based resin.

A first connecting electrode CNE1 is disposed on the fifth insulating layer 317. The first connecting electrode CNE1 is connected to the connecting signal line SCL through a contact hole CNT that penetrates the first insulating layer 313 to the fifth insulating layer 317.

A second connecting electrode CNE2 is disposed on the first organic insulating layer 318. The second connecting electrode CNE2 is connected to the first connecting electrode CNE1 through a first via hole VIA1 that penetrates the first organic insulating layer 318.

The light-emitting device OLED1 is disposed on the third organic insulating layer 320. The light-emitting device OLED1 includes a pixel electrode 331, an intermediate layer 332, and an opposite electrode 333. The pixel electrode 331 is disposed on the third organic insulating layer 320. In addition, a pixel defining layer 323 is disposed on the third organic insulating layer 320.

The pixel electrode 331 is electrically connected to the second connecting electrode CNE2 through a second via hole VIA2 in the penetrates the second organic insulating layer 319 and the third organic insulating layer 320. The pixel electrode 331 includes a conductive oxide such as indium tin oxide (ITO), indium zinc oxide (IZO), zinc oxide (ZnO), indium oxide ($In_2O_3$), indium gallium oxide, or aluminum zinc oxide (AZO). In an embodiment, the pixel electrode 331 includes a reflective layer that includes at least one of silver (Ag), magnesium (Mg), aluminum (Al), platinum (Pt), palladium (Pd), gold (Au), nickel (Ni), neodymium (Nd), iridium (Ir), chromium (Cr), or a compound thereof. In an embodiment, the pixel electrode 331 further includes a layer that includes at least one of ITO, IZO, ZnO, or $In_2O_3$ on and/or under the reflective layer. For example, the pixel electrode 331 has a multi-layered structure that includes ITO/Ag/ITO.

The pixel defining layer 323 includes an opening 3230P that exposes at least a part of the pixel electrode 331, and is disposed on the pixel electrode 331 and the third organic insulating layer 320. The opening 3230P of the pixel defining layer 323 defines an emission area EA for light emitted from the light-emitting device OLED1. For example, a width of the opening 3230P corresponds to a width of the emission area EA. A periphery of the emission area EA is a non-emission area NEA, and the non-emission area NEA surrounds the emission area EA.

The pixel defining layer 323 includes an organic insulating material. In an embodiment, the pixel defining layer 323 includes an inorganic insulating material such as silicon nitride, silicon oxynitride, or silicon oxide. In an embodiment, the pixel defining layer 323 includes an organic insulating material and an inorganic insulating material. In an embodiment, the pixel defining layer 323 is light-blocking material and is black. The light-blocking material includes at least one of carbon black, carbon nanotubes, a resin or a paste that includes a black dye, metal particles, such as nickel, aluminum, molybdenum, or an alloy thereof, metal oxide particles, such as chromium oxide, or metal nitride particles, such as chromium nitride, etc. When the pixel defining layer 323 includes a light-blocking material, external light reflection due to metal structures under the pixel defining layer 323 is reduced.

In addition, a spacer is disposed on the pixel defining layer 323. The spacer includes an organic insulating material such as polyimide. In an embodiment, the spacer includes an inorganic insulating material such as silicon nitride ($SiN_x$) or silicon oxide ($SiO_2$), or includes an organic insulating material and an inorganic insulating material.

In an embodiment, the spacer includes the same material as the pixel defining layer 323. The pixel defining layer 323 and the spacer are formed along with each other during a mask process that uses a halftone mask. In an embodiment, the spacer includes a different material from the pixel defining layer 323.

The intermediate layer 332 is disposed on the pixel electrode 331. The intermediate layer 332 includes a first functional layer 332a, an emission layer 332b, and a second functional layer 332c that are sequentially stacked. The first functional layer 332a and the second functional layer 332c are collectively referred to as an organic functional layer 332e.

The emission layer 332b is formed in the opening 3230P of the pixel defining layer 323. The emission layer 332b includes a polymer or a low-molecular weight organic material that emits predetermined color light.

The organic functional layer 332e includes at least one of the first functional layer 332a between the pixel electrode 331 and the emission layer 332b, and the second functional layer 332c between the emission layer 332b and the opposite electrode 333. For example, the first functional layer 332a is disposed between the pixel electrode 331 and the emission layer 332b, and the second functional layer 332c is omitted between the emission layer 332b and the opposite electrode 333. In an embodiment, the first functional layer 332a between the pixel electrode 331 and the emission layer 332b is omitted, and the second functional layer 332c is disposed between the emission layer 332b and the opposite electrode 333. In an embodiment, the first functional layer 332a is disposed between the pixel electrode 331 and the emission layer 332b, and the second functional layer 332c is disposed between the emission layer 332b and the opposite electrode 333. Hereinafter, an embodiment in which each of the first functional layer 332a and the second functional layer 332c is disposed will be described in detail.

The first functional layer 332a includes, for example, a hole transport layer (HTL), and a hole injection layer (HIL). The second functional layer 332c includes an electron transport layer (ETL) and/or an electron injection layer (EIL). The first functional layer 332a and/or the second functional layer 332c are common layers that entirely cover the substrate BS.

The opposite electrode 333 is formed on the organic functional layer 332e. The opposite electrode 333 includes a conductive material that has a low work function. For example, the opposite electrode 333 includes a (semi-)transparent layer that includes at least one of silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or an alloy thereof. In an embodiment, the opposite electrode 333 further includes a layer that includes on of ITO, IZO, ZnO, or $In_2O_3$ disposed on the (semi-)transparent layer that includes the above material.

In addition, a capping layer is further disposed on the opposite electrode 333. The capping layer may include LiF, an inorganic material, and/or an organic material.

An encapsulation member is disposed on the light-emitting device OLED1. The encapsulation member includes a thin film encapsulation layer 340. In an embodiment, the thin film encapsulation layer 340 is the encapsulation member, but embodiments are not necessarily limited thereto. In an embodiment, encapsulation member is an encapsulation substrate.

The thin film encapsulation layer 340 includes at least one inorganic layer and at least one organic layer. For example, the thin film encapsulation layer 340 includes a first inorganic layer 341, an organic layer 342, and a second inorganic layer 343 that are sequentially stacked.

The first inorganic layer 341 is disposed directly on the opposite electrode 333. The first inorganic layer 341 prevents or reduces infiltration of external moisture or oxygen into the light-emitting device OLED1.

The organic layer 342 is disposed directly on the first inorganic layer 341. The organic layer 342 provides a flat surface on the first inorganic layer 341. Curvatures, particles, etc., on an upper surface of the first inorganic layer 341 are covered by the organic layer 342, and thus, an influence of the upper surface state of the first inorganic layer 341 on the elements formed on the organic layer 342 is prevented.

The second inorganic layer 343 is disposed directly on the organic layer 342. The second inorganic layer 343 prevents or reduces discharge of moisture, etc., from the organic layer 342.

The first and second inorganic layers 341 and 342 include one or more inorganic materials such as aluminum oxide, titanium oxide, tantalum oxide, hafnium oxide, zinc oxide, silicon oxide, silicon nitride, or silicon oxynitride. Each of the first inorganic layer 341 and the second inorganic layer 343 has a single-layered structure or a multi-layered structure that includes the above-mentioned materials. The organic layer 342 includes a polymer-based material. The polymer-based material is at least one of an acryl-based resin, an epoxy-based resin, polyimide, polyethylene, etc. In an embodiment, the organic layer 342 includes acrylate.

An input sensor 350 is disposed on the encapsulation member. The input sensor 350 includes a plurality of conductive patterns 352 and 354, a first sensing insulation layer 351, a second sensing insulation layer 353, and a third sensing insulation layer 355.

The first sensing insulation layer 351 is disposed on the encapsulation member. In addition, the first conductive patterns 352 is disposed on the first sensing insulation layer 351 and is covered by the second sensing insulation layer 353. In addition, the second conductive patterns 354 is disposed on the second sensing insulation layer 353 and is covered by the third sensing insulation layer 355. The first sensing insulation layer 351, the second sensing insulation layer 353, and the third sensing insulation layer 355 each include at least one of an inorganic material or an organic material.

Each of the conductive patterns 352 and 354 are electrically conductive. Each of the conductive patterns 352 and 354 has a single layer or a multiple layer structure. In addition, at least one of the conductive patterns 352 and 354 includes mesh lines on a plane.

The mesh lines in the conductive patterns 352 and 354 do not overlap the emission layer 332b on a plane. Therefore, even when the input sensor 350 is directly formed on the display panel 50, light generated by the pixels PX of the display panel DP propagates to a user without interference from the input sensor 350.

When a black matrix 360 is formed directly on the second conductive pattern 354, the second conductive pattern 354 can be damaged during a process of patterning the black matrix 360. Therefore, when the third sensing insulation layer 355 is disposed between the second conductive pattern 354 and the black matrix 360, damage to the second conductive pattern 354 can be prevented or reduced.

A color filter 370 is disposed on the input sensor 350. The color filter 370 at least partially overlaps the emission layer 332b disposed thereunder. The color filter 370 selectively transmits light that corresponds to light provided from the emission layer 332b. For example, when the emission layer 332b emits blue light, the color filter 370 includes a blue color filter that transmits blue light. When the emission layer 332b emits green light, the color filter 370 includes a green color filter that transmits green light. When the emission layer 332b emits red light, the color filter 370 includes a red color filter that transmits red light.

The color filter 370 includes a polymer photosensitive resin and a pigment or a dye. For example, the color filter 370 that overlaps the emission layer 332b that emits blue light includes a blue pigment or dye, the color filter 370 that overlaps the emission layer 332b that emits green light includes a green pigment or dye, and the color filter 370 that overlaps the emission layer 332b that emits red light includes a red pigment or dye.

However, embodiments are not necessarily limited thereto, and in an embodiment, the color filter 370 that overlaps the emission layer 332b that provides blue light does not include a pigment or a dye. The color filter 370 is transparent and includes a transparent photosensitive resin.

The black matrix 360 is disposed between color filters 370 that provide different light from each other. The black matrix 360 has a pattern of black color, such as a lattice shaped matrix. The black matrix 360 includes a black coloring agent. The black coloring agent includes a black pigment and a black dye. The black coloring agent may include a metal such as carbon black and chrome, or an oxide thereof. In an embodiment, the black matrix 360 includes the same material as the pixel defining layer 323.

In an embodiment, the black matrix 360 includes an opening 3600P that overlaps the emission area EA of the light-emitting device OLED1. A width of the opening 3600P of the black matrix 360 is equal to or greater than a width of the emission area EA of the light-emitting device OLED1 and/or the opening 3230P of the pixel defining layer 323. However, embodiments are not necessarily limited thereto. In an embodiment, the color filter 370 is located in the opening 3600P of the black matrix 360.

An overcoat layer 380 is disposed on the color filter 370 and the black matrix 360. The overcoat layer 380 includes a transmissive layer that surrounds irregularities generated while forming the black matrix 360 and provides a flat upper surface. For example, the overcoat layer 380 includes a light-transmissive organic material such as an acryl-based resin.

Referring to FIG. 4B, the display panel 50 includes the substrate BS, the buffer layer 311, the insulating layers IL, the light-emitting device OLED1, the thin film encapsulation layer 340, and the input sensor 350. Here, the display panel 50 does not include the color filter 370, the black matrix 360, and the overcoat layer 380.

Figure 5:
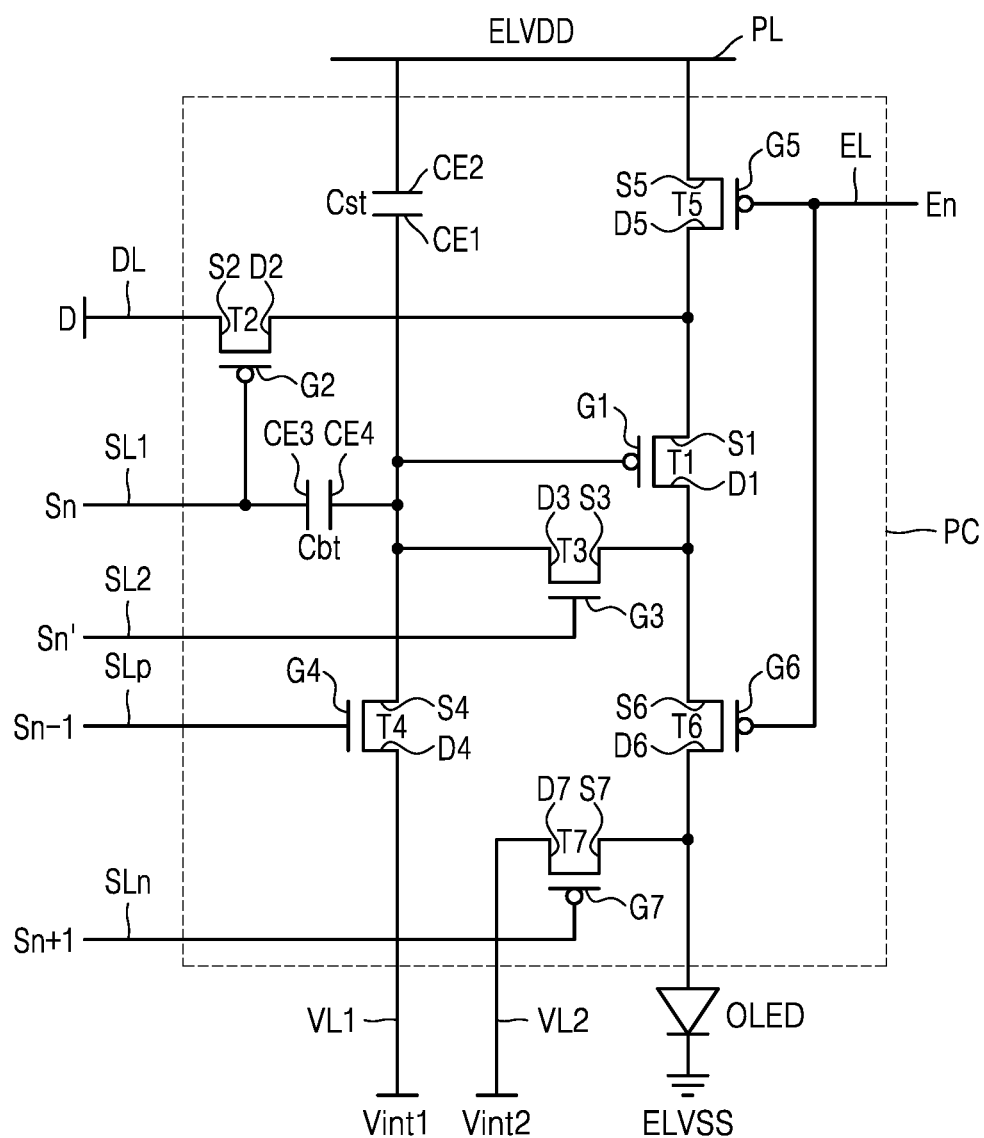
FIG. 5 is an equivalent circuit diagram of a pixel of a display panel of FIG. 3.

FIG. 5 is an equivalent circuit diagram of a pixel of a display panel of FIG. 3.

Referring to FIG. 5, in an embodiment, a pixel circuit PC includes the first transistor T1, the second transistor T2, the third transistor T3, the fourth transistor T4, the fifth transistor T5, the sixth transistor T6, the seventh transistor T7, the first storage capacitor Cst, and a second storage capacitor Cbt. In an embodiment, at least one of the first to seventh transistors T1 to T7 may be omitted.

The first to seventh transistors T1, T2, T3, T4, T5, T6, and T7 and the first and second storage capacitors Cst and Cbt are connected to signal lines, a first initialization voltage line VL1, a second initialization voltage line VL2, and a driving voltage line PL. The signal lines include a data line DL, a first scan line SL1, a second scan line SL2, a previous scan line SLp, a next scan line SLn, and an emission control line EL. In an embodiment, the signal lines, the first and second initialization voltage lines VL1 and VL2, and/or the driving voltage line PL are shared by adjacent pixels.

The driving voltage line PL transmits a first power voltage ELVDD to the first transistor T1. The first initialization voltage line VIL1 transmits a first initialization voltage Vint1 to the pixel circuit PC that initializes the first transistor T1. The second initialization voltage line VIL2 transmits a second initialization voltage Vint2 to the pixel circuit PC that initializes a light-emitting device OLED.

The third transistor T3 and the fourth transistor T4 are implemented as n-channel MOSFET (NMOS) transistors, and the other transistors are implemented as p-channel MOSFET (PMOS) transistors. However, embodiments are not necessarily limited thereto. In an embodiment, the third transistor T3, the fourth transistor T4, and the seventh transistor T7 are implemented as NMOS transistors, and the others are implemented as PMOS transistors.

In the specification, a phase "a transistor and a signal line or a transistor and another transistor are electrically connected" indicates that "a source, a drain, and a gate of the transistor are integrally formed with a signal line or connected via a connecting electrode."

The first transistor T1 controls a magnitude of the driving current flowing from the driving voltage line PL to a light-emitting device OLED according to a gate voltage. The first transistor T1 includes the gate G1 connected to the first electrode CE1 of the first storage capacitor Cst, and the source S1 connected to the driving voltage line PL via the fifth transistor T5. In addition, the first transistor T1 includes the drain D1 connected to the light-emitting device OLED via the sixth transistor T6.

The second transistor T2 receives a data voltage D in response to the first scan signal Sn. The second transistor T2 transmits the data voltage D to the source S1 of the first transistor T1, in response to the first scan signal Sn. The second transistor T2 includes the gate G2 connected to the first scan line SL1, the source S2 connected to the data line DL, and the drain D2 connected to the source S1 of the first transistor T1.

The first storage capacitor Cst is connected between the driving voltage line PL and the first transistor T1. The first storage capacitor Cst includes the second electrode CE2 connected to the driving voltage line PL, and the first electrode CE1 connected to the gate G1 of the first transistor T1. The first storage capacitor Cst stores a difference between the first driving voltage ELVDD applied to the driving voltage line PL and a gate voltage of the first transistor T1, and maintains the gate voltage of the first transistor T1.

The third transistor T3 is connected between the drain D1 and the gate G1 of the first transistor T1 in series and connects the drain D1 and the gate G1 of the first transistor T1 to each other in response to a second scan signal Sn'. The third transistor T3 includes the gate G3 connected to the second scan line SL2, the source S3 connected to the drain D1 of the first transistor T1, and the drain D3 connected to the gate G1 of the first transistor T1. In an embodiment, the third transistor T3 is implemented as a plurality of transistors that are connected to each other in series and simultaneously controlled by the second scan signal Sn'. In an embodiment, the third transistor T3 is omitted.

When the third transistor T3 is turned on in response to the second scan signal Sn', the drain D1 and the gate G1 of the first transistor T1 are connected to diode-connect the first transistor T1.

The fourth transistor T4 transmits the first initialization voltage Vint1 to the gate G1 of the first transistor T1, in response to the previous scan signal Sn−1. The fourth transistor T4 includes the gate G4 connected to the previous scan line SLp, the source S4 connected to the gate G1 of the first transistor T1, and the drain D4 connected to the first initialization voltage line VL1. In an embodiment, the fourth transistor T4 includes a plurality of transistors that are connected to each other in series and simultaneously controlled by the previous scan signal Sn−1. In an embodiment, the fourth transistor T4 is omitted.

The fifth transistor T5 connects the driving voltage line PL to the source S1 of the first transistor T1 in response to a light-emitting control signal En. The fifth transistor T5 includes the gate G5 connected to the emission control line EL, the source S5 connected to the driving voltage line PL, and the drain D5 connected to the source S1 of the first transistor T1. In an embodiment, the fifth transistor T5 is omitted.

The sixth transistor T6 connects the drain D1 of the first transistor T1 to an anode of the light-emitting control signal OLED in response to the light-emitting control signal En. The sixth transistor T6 transmits a driving current received from the first transistor T1 to the anode of the light-emitting device OLED. The sixth transistor T6 includes the gate G6 connected to the emission control line EL, the source S6 connected to the drain D1 of the first transistor T1, and the drain D6 connected to the anode of the light-emitting device OLED. In an embodiment, the sixth transistor T6 is omitted.

The seventh transistor T7 transmits the second initialization voltage Vint2 to the anode of the light-emitting device OLED in response to a next scan signal Sn+1. The seventh transistor T7 includes the gate G7 connected to the next scan line SLn, the source S7 connected to the anode of the light-emitting device OLED, and the drain D7 connected to the second initialization voltage line VL2. In an embodiment, the seventh transistor T7 is omitted.

The seventh transistor T7 may be connected to the next scan line SLn as shown in FIG. 5. In an embodiment, the seventh transistor T7 is connected to the emission control line EL and is driven according to the light-emitting control signal En. In an embodiment, the seventh transistor T7 is connected to the previous scan line SLp and is driven according to the previous scan line SLp.

In addition, according to embodiments, positions of the sources and the drains may be exchanged according to the types of the transistors (p-type or n-type).

The second storage capacitor Cbt includes a third electrode CE3 and a fourth electrode CE4. The fourth electrode CE4 of the second storage capacitor Cbt is connected to the first electrode CE1 of the first storage capacitor Cst, and the third electrode CE3 of the second storage capacitor Cbt is provided with the first scan signal Sn. The second storage capacitor Cbt elevates a voltage of a gate terminal of the first transistor T1 at a time point when supply of the first scan signal Sn is stopped, and thus, compensates for a voltage drop of the gate terminal. In an embodiment, the second storage capacitor Cbt is omitted.

Hereinafter, a reinforcing member is described in detail below. However, for convenience of description, the reinforcing member provided in a display device shown in FIG. 2A will be described in detail.

Figure 6A:
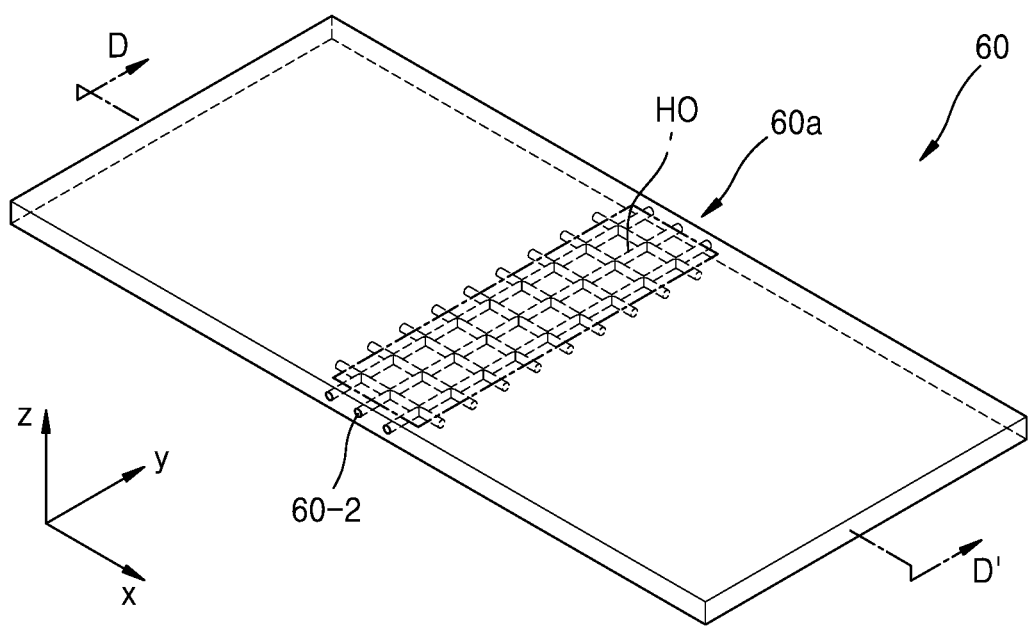
FIG. 6A is a perspective view of a reinforcing member of a display device of FIG. 1A or FIG. 2A.
Figure 6B:
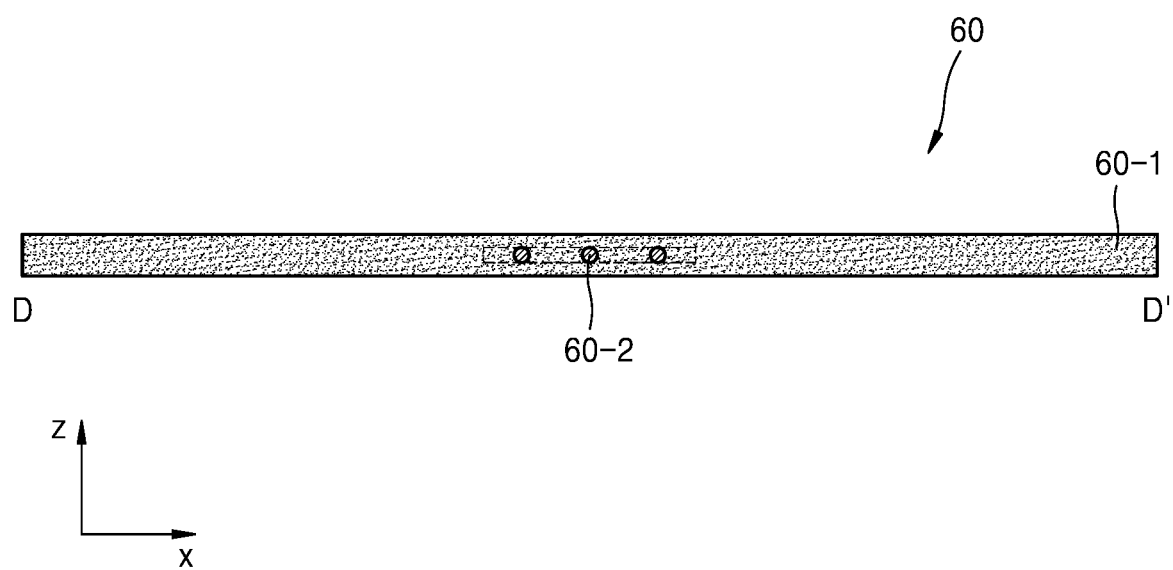
FIG. 6B is a cross-sectional view of a reinforcing member of FIG. 6A taken along line D-D'.

FIG. 6A is a perspective view of a reinforcing member 60 of a display device of FIG. 1A or FIG. 2A. FIG. 6B is a cross-sectional view of the reinforcing member 60 of FIG. 6A taken along line D-D'.

Referring to FIGS. 6A and 6B, in an embodiment, the reinforcing member 60 includes a first reinforcing member layer 60-2 and a second reinforcing member layer 60-1. The first reinforcing member layer 60-2 is inserted into the second reinforcing member layer 60-1.

A thickness of the reinforcing member 60 is from about 50 μm to about 200 μm. When the thickness of the reinforcing member 60 is less than 50 μm, the display panel 50 might not be supported, and thus, the display panel 50 might not be maintained flat when unfolding the display panel 50. In addition, when the thickness of the reinforcing member 60 exceeds 200 μm, the folding of the display device 1 might not be smoothly performed. The thickness is a distance from a lower surface to an upper surface of the reinforcing member 60.

The second reinforcing member layer 60-1 includes at least one of a silicon-based polymer, a urethane-based polymer, an aramid-based polymer, or elastomer. In addition, the first reinforcing member layer 60-2 includes at least one of aluminum, stainless steel (SUS), glass fiber, or carbon fiber.

In an embodiment, the second reinforcing member layer 60-1 covers and surrounds the first reinforcing member layer 60-2. The first reinforcing member layer 60-2 may be entirely disposed in the second reinforcing member layer 60-1 or may be only partially disposed in the second reinforcing member layer 60-1. A reinforcing member folding area 60a is an area of the reinforcing member 60 that is located on the folding portion of the display device 1, and is an area where the first reinforcing member layer 60-2 and the second reinforcing member layer 60-1 are both formed.

In an embodiment, when the reinforcing member folding area 60a does not include the entire reinforcing member 60, the region 60b other than the reinforcing member folding area 60a only includes the second reinforcing member layer 60-1.

In an embodiment, the first reinforcing member layer 60-2 has a lattice shape. For example, the first reinforcing member layer 60-2 includes open areas HO. The open areas HO may each have a square shape or a rectangular shape. A side of an open area HO is parallel to one of a lengthwise direction or a width direction of the reinforcing member 60. The open area HO includes a plurality of open areas HO, and the plurality of open areas HO are spaced apart from each other at constant intervals.

A thickness of the first reinforcing member layer 60-2 is from about 10 μm to about 100 μm. When the thickness of the first reinforcing member layer 60-2 is less than 10 μm, the display device 1 might not remain flat when unfolding the display device 1. In addition, when the thickness of the first reinforcing member layer 60-2 exceeds 100 μm, the display device 1 might not be smoothly folded when folding the display device 1, or a curvature radius of the folded area of the display device 1 may be too large.

In an embodiment, an elastic coefficient of the first reinforcing member layer 60-2 is from about 10 GPa to about 70 GPa. In addition, an elastic coefficient of the second reinforcing member layer 60-1 is from about 0.1 GPa to about 10 GPa.

In an embodiment, when the elastic coefficient of the first reinforcing member layer 60-2 is less than 10 GPa, an excessive force may be needed to fold the display device 1 because the deformation does not occur easily. In addition, when the elastic coefficient of the first reinforcing member layer 60-2 exceeds 70 GPa, the deformation can occur with only a small force, and the display panel 50 might not be supported by the folding area of the display device 1 when unfolding the display device 1.

In addition, when the elastic coefficient of the second reinforcing member layer 60-1 is less than 0.1 GPa, the deformation does not occur easily, and an excessive force may be needed to fold the display device 1. In addition, when the elastic coefficient of the second reinforcing member layer 60-1 exceeds 10 GPa, the deformation can occur with a small force, and thus, the display panel 50 might not supported by the folding area of the display device 1 when unfolding the display device 1.

In an embodiment, because the reinforcing member folding area 60a corresponds to the folding area of the display device as described above, the display device 1 is sufficiently rigid so that the display device 1 continues to unfold when unfolding the display device 1. In addition, because one surface of the reinforcing member 60 is maintained flat and uniform, the surface of the display panel 50 that displays an image is not curved, when unfolding the display panel 50.

FIGS. 7A to 7E are cross-sectional views of the reinforcing member 60 of the display device according to embodiments of the disclosure.

Figure 7A:
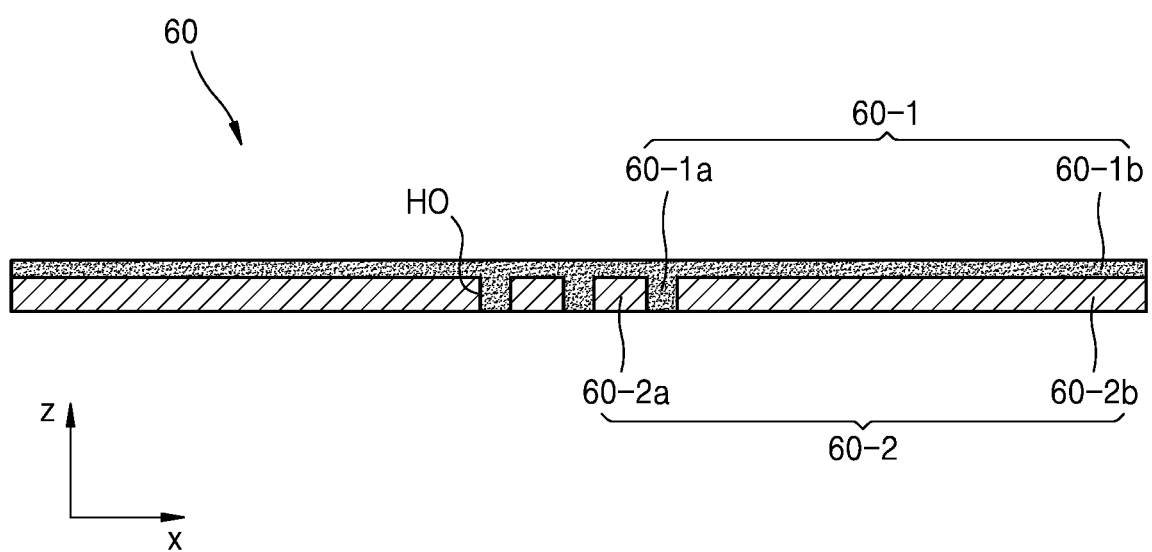
FIGS. 7A to 7E are cross-sectional views of a reinforcing member of a display device according to one or more embodiments of the disclosure.

Referring to FIG. 7A, in an embodiment, the reinforcing member 60 includes a first reinforcing member layer 60-2 and a second reinforcing member layer 60-1. The second reinforcing member layer 60-1 is disposed on the first reinforcing member layer 60-2. The first reinforcing member layer 60-2 is formed not only in the reinforcing member folding area 60a, but also in the other area 60b of the reinforcing member 60. The first reinforcing member layer 60-2 in the reinforcing member folding area 60a includes the open areas HO as shown in FIG. 6A. The first reinforcing member layer 60-2 that is not arranged in the reinforcing member folding area 60a has a flat plate shape. That is, the first reinforcing member layer 60-2 may include a 1-1st reinforcing member layer 60-2a that defines the open area HO and a 1-2nd reinforcing member layer 60-2b that has a plate shape.

The second reinforcing member layer 60-1 is partially inserted in the open areas HO of the first reinforcing member layer 60-2, and covers the first reinforcing member layer 60-2. The second reinforcing member layer 60-1 includes a 2-1st reinforcing member layer 60-1a and a 2-2nd reinforcing member layer 60-1b. The 2-1st reinforcing member layer 60-1a shields the open areas HO and is partially inserted in the open areas HO, and the 2-2nd reinforcing member layer 60-1b has a plate shape and is disposed on the 1-2nd reinforcing member layer 60-2b.

The second reinforcing member layer 60-1 includes at least one of a silicon-based polymer, a urethane-based polymer, an aramid-based polymer, or elastomer. In addition, the first reinforcing member layer 60-2 includes at least one of aluminum, stainless steel (SUS), glass fiber, or carbon fiber.

Figure 7B:
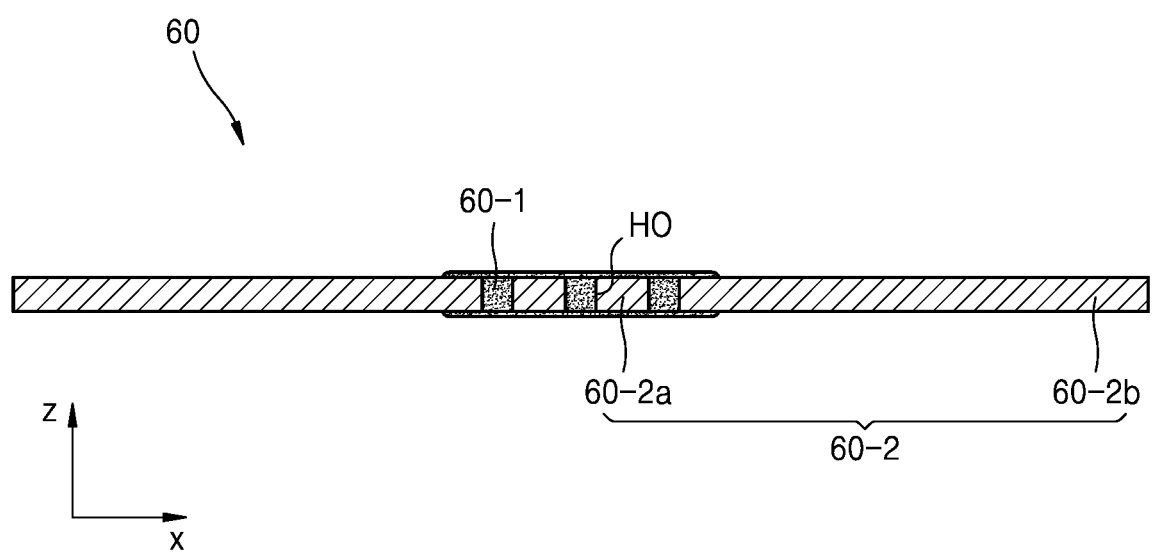

Referring to FIG. 7B, in an embodiment, the first reinforcing member layer 60-2 is disposed on the entire surface of the display panel 50. The first reinforcing member layer 60-2 includes the open areas HO formed therein, and the second reinforcing member layer 60-1 shields the open areas HO. The first reinforcing member layer 60-2 includes the 1-1st reinforcing member layer 60-2a that defines the open area HO, and the 1-2nd reinforcing member layer 60-2b that has a plate shape and is connected to the 1-1st reinforcing member layer 60-2a. The 1-1st reinforcing member layer 60-2a is formed in the folding area of the display panel 50, and the 1-2nd reinforcing member layer 60-2b is arranged in the non-folding area of the display panel 50.

The second reinforcing member layer 60-1 includes at least one of a silicon-based polymer, a urethane-based polymer, an aramid-based polymer, or elastomer. In addition, the first reinforcing member layer 60-2 includes at least one of aluminum, stainless steel (SUS), glass fiber, or carbon fiber.

Figure 7C:
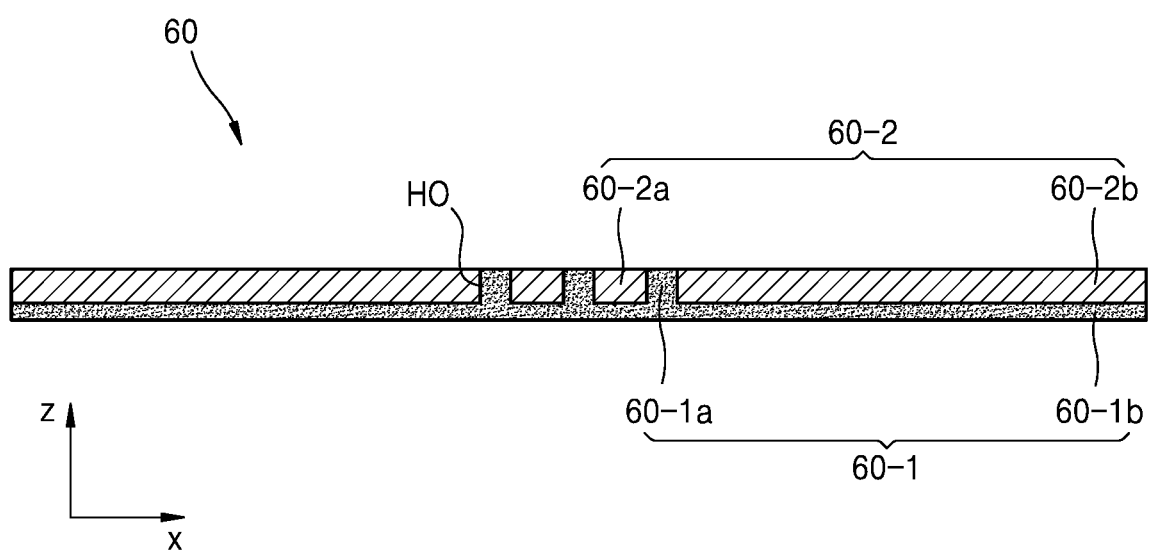

Referring to FIG. 7C, in an embodiment, the first reinforcing member layer 60-2 is disposed adjacent to the display panel 50, and the second reinforcing member layer 60-1 is disposed on a lower surface of the first reinforcing member layer 60-2. The first reinforcing member layer 60-2 includes the 1-1st reinforcing member layer 60-2a that defines the open areas HO, and the 1-2nd reinforcing member layer 60-2b that is connected to the 1-1st reinforcing member layer 60-2a. In addition, the second reinforcing member layer 60-1 includes the 2-1st reinforcing member layer 60-1a that is inserted into the open areas HO, and the 2-2nd reinforcing member layer 60-1b that is disposed under and corresponds to the 1-2nd reinforcing member layer 60-2b.

The second reinforcing member layer 60-1 includes at least one of a silicon-based polymer, a urethane-based polymer, an aramid-based polymer, or elastomer. In addition, the first reinforcing member layer 60-2 includes at least one of aluminum, stainless steel (SUS), glass fiber, or carbon fiber.

Figure 7D:
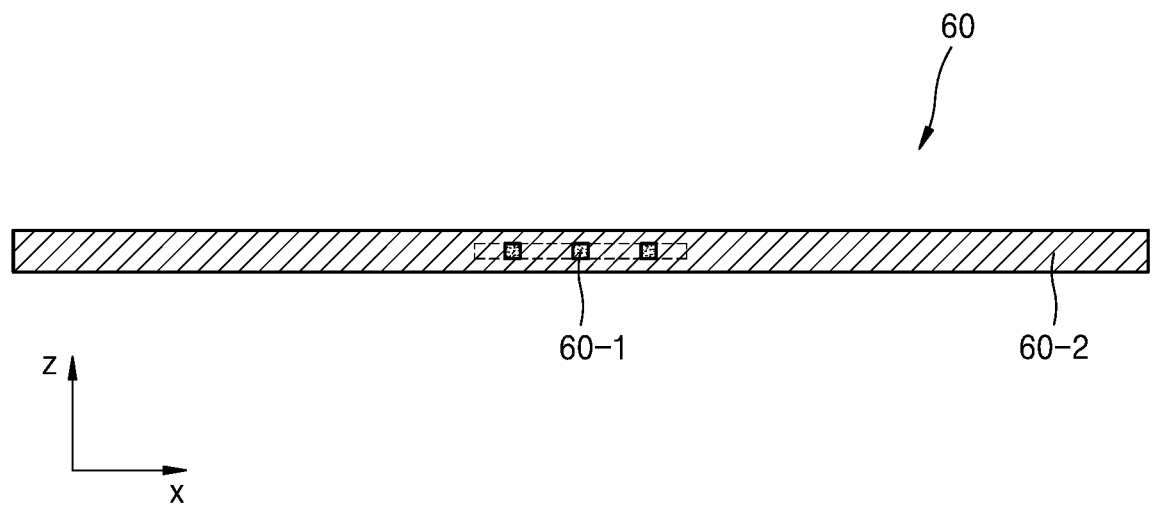

Referring to FIG. 7D, in an embodiment, the second reinforcing member layer 60-1 is inserted into the first reinforcing member layer 60-2. The second reinforcing member layer 60-1 has a lattice shape. In addition, the first reinforcing member layer 60-2 is inserted in the open areas of the lattice shape of the second reinforcing member layer 60-1. Lattice-shaped holes are formed in the first reinforcing member layer 60-2, and then, the second reinforcing member layer 60-1 may be injected thereinto.

The second reinforcing member layer 60-1 includes at least one of a silicon-based polymer, a urethane-based polymer, an aramid-based polymer, or elastomer. In addition, the first reinforcing member layer 60-2 includes at least one of aluminum, stainless steel (SUS), glass fiber, or carbon fiber.

Figure 7E:
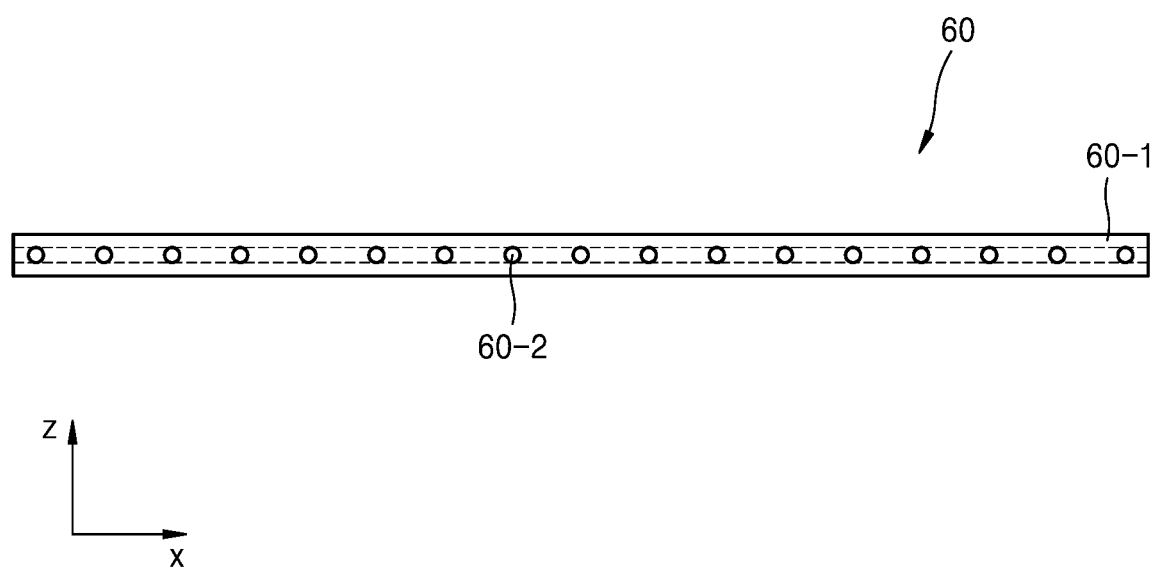

Referring to FIG. 7E, in an embodiment, the first reinforcing member layer 60-2 has a lattice shape in the entire the reinforcing member 60. The second reinforcing member layer 60-1 entirely surrounds the first reinforcing member layer 60-2. For example, the second reinforcing member layer 60-1 is inserted into the first reinforcing member layer 60-2.

The second reinforcing member layer 60-1 includes at least one of a silicon-based polymer, a urethane-based polymer, an aramid-based polymer, or elastomer. In addition, the first reinforcing member layer 60-2 includes at least one of aluminum, stainless steel (SUS), glass fiber, or carbon fiber.

In an above-described structure, according to embodiments, the second reinforcing member layer 60-1 may be arranged in the position of the first reinforcing member layer 60-2, and the first reinforcing member layer 60-2 may be arranged in the position of the second reinforcing member layer 60-1. In addition, the lattice of the first reinforcing member layer 60-2 or the second reinforcing member layer 60-1 may be arranged in at least two spaced apart portions of the reinforcing member 60, not in one part of the reinforcing member 60 as shown in FIG. 6A, 6B, 7A, 7B, 7C, or 7D. In an embodiment, the lattice of the first reinforcing member layer 60-2 or the second reinforcing member layer 60-1 is arranged in the entire reinforcing member 60 as shown in FIG. 7E.

Therefore, through the combination of the first reinforcing member layer 60-2 and the second reinforcing member layer 60-1, a force is secured that supports the display panel 50, and the folding of the display panel 50 is enabled.

Figure 8:
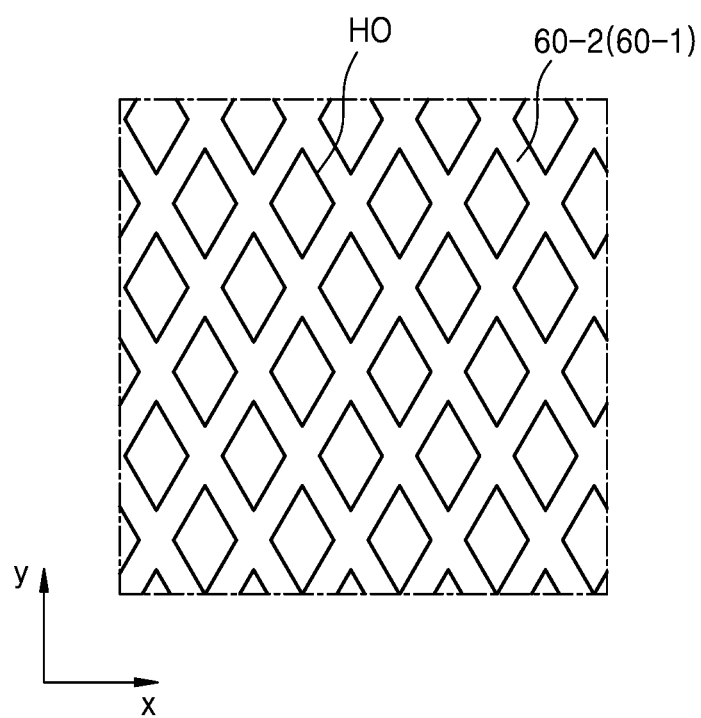
FIG. 8 is a plan view of a first reinforcing member layer or a second reinforcing member layer of a reinforcing member according to an embodiment of the disclosure.

FIG. 8 is a plan view of one of the first reinforcing member layer 60-2 or the second reinforcing member layer 60-1 in the reinforcing member 60 according to an embodiment of the present disclosure.

Referring to FIG. 8, in an embodiment, the lattice of the first reinforcing member layer 60-2 or the second reinforcing member layer 60-1 may have various shapes. For example, the open areas HO in the lattice each have a rhombus shape. One side of the open area HO extends in an inclined direction with respect to a side of the display device 1.

In an embodiment, when the display device 1 is folded, an elongation of the second reinforcing member layer 60-1 or the first reinforcing member layer 60-2 in the folded part of the display device is increased.

Figure 9:
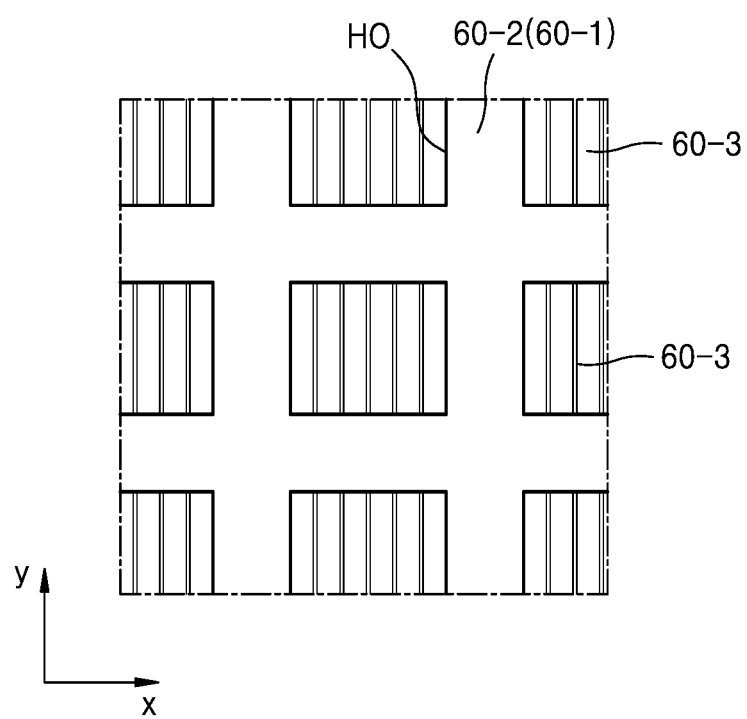
FIG. 9 is a plan view of one of a first reinforcing member layer or a second reinforcing member layer of a reinforcing member according to an embodiment of the disclosure.

FIG. 9 is a plan view of one of the first reinforcing member layer 60-2 and the second reinforcing member layer 60-1 in the reinforcing member 60 according to an embodiment of the present disclosure.

Referring to FIG. 9, in an embodiment, the reinforcing member 60 further includes an auxiliary layer 60-3 disposed in the open area HO formed by one of the first reinforcing member layer 60-2 or the second reinforcing member layer 60-1. The auxiliary layer 60-3 is connected to one of the first reinforcing member layer 60-2 or the second reinforcing member layer 60-1. In addition, the other of the first reinforcing member layer 60-2 or the second reinforcing member layer 60-1 is inserted into the open areas HO. The auxiliary layer 60-3 is inserted into the other of the first reinforcing member layer 60-2 or the second reinforcing member layer 60-1.

For example, when the first reinforcing member layer 60-2 has a lattice shape and forms the open areas HO, the auxiliary layer 60-3 is connected to the first reinforcing member layer 60-2 and extends through the open areas HO. The auxiliary layer 60-3 includes the same material as the first reinforcing member layer 60-2 and is integrally formed with the first reinforcing member layer 60-2.

For example, when the second reinforcing member layer 60-1 has a lattice shape, the auxiliary layer 60-3 is connected to the second reinforcing member layer 60-1. The auxiliary layer 60-3 includes the same material as the second reinforcing member layer 60-1 and is integrally formed with the second reinforcing member layer 60-1.

The auxiliary layer 60-3 as above increases the strength of which of the first reinforcing member layer 60-2 or the second reinforcing member layer 60-1 has a lattice shape.

In an embodiment, a cross-sectional area of the auxiliary layer 60-3 perpendicular to the lengthwise direction of the auxiliary layer 60-3 is less than a cross-sectional area of one of the first reinforcing member layer 60-2 or the second reinforcing member layer 60-1 perpendicular to the lengthwise direction, such as an x-axis direction or a y-axis direction of FIG. 9, of one of the first reinforcing member layer 60-2 or the second reinforcing member layer 60-1.

Figure 10:
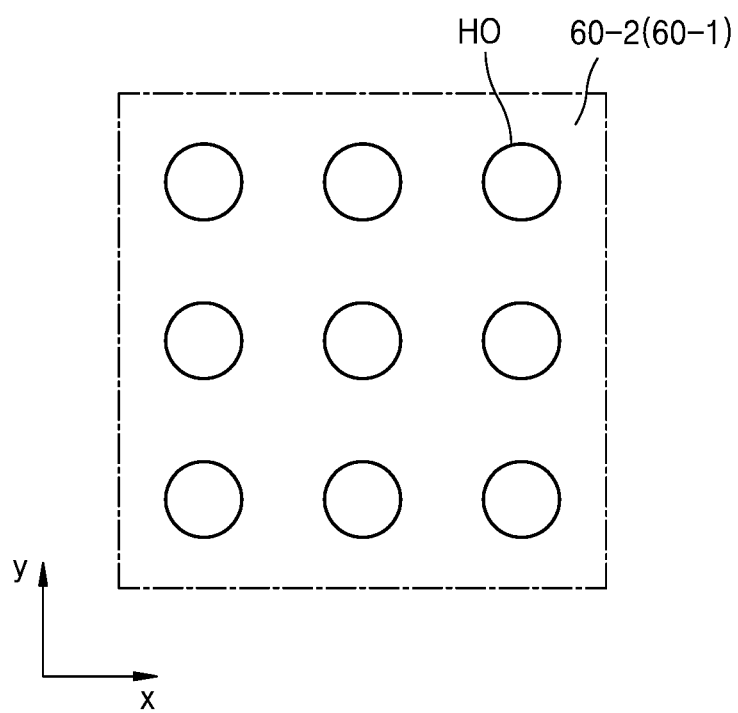
FIG. 10 is a plan view of one of a first reinforcing member layer or a second reinforcing member layer of a reinforcing member according to an embodiment of the disclosure.

FIG. 10 is a plan view of one of the first reinforcing member layer 60-2 or the second reinforcing member layer 60-1 in the reinforcing member 60 according to an embodiment of the present disclosure.

Referring to FIG. 10, in an embodiment, one of the first reinforcing member layer 60-2 or the second reinforcing member layer 60-1 includes open areas HO. A planar shape of the open area HO is circular. The other of the first reinforcing member layer 60-2 or the second reinforcing member layer 60-1 is inserted into the open areas HO.

Figure 11:
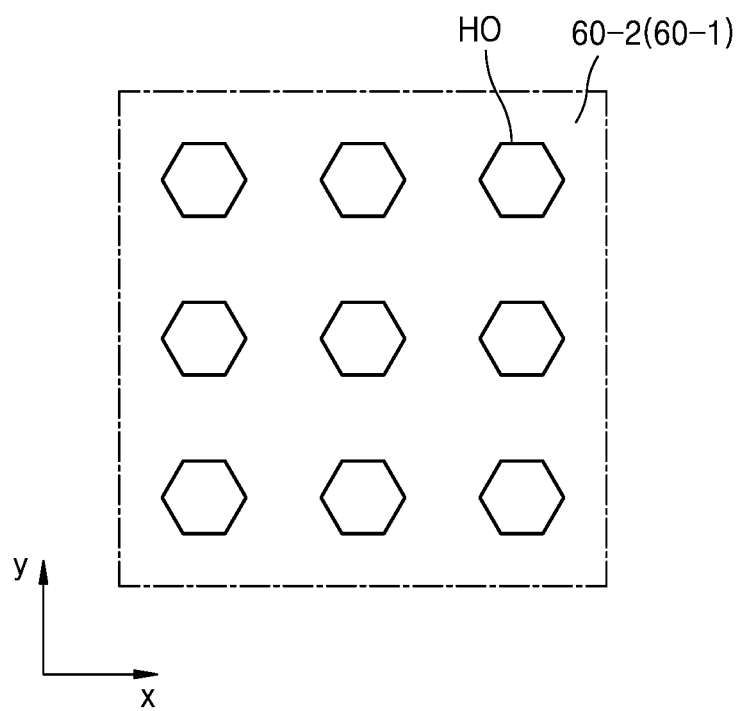
FIG. 11 is a plan view of one of a first reinforcing member layer or a second reinforcing member layer of a reinforcing member according to an embodiment of the disclosure.

FIG. 11 is a plan view of one of the first reinforcing member layer 60-2 or the second reinforcing member layer 60-1 in the reinforcing member 60 according to an embodiment of the present disclosure.

Referring to FIG. 11, in an embodiment, one of the first reinforcing member layer 60-2 or the second reinforcing member layer 60-1 includes open areas HO. A planar shape of each of the open areas HO is hexagonal. The other of the first reinforcing member layer 60-2 or the second reinforcing member layer 60-1 is inserted into the open areas HO. In addition, the planar shape of the open area HO may be any polygonal shape.

Figure 12A:
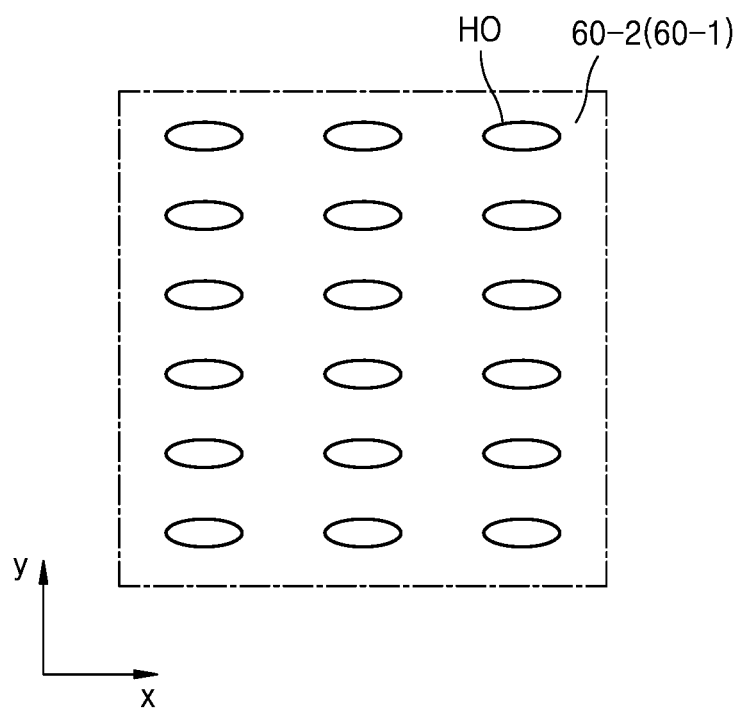
FIGS. 12A and 12B are plan views of one of a first reinforcing member layer or a second reinforcing member layer of a reinforcing member according to an embodiment of the disclosure.
Figure 12B:
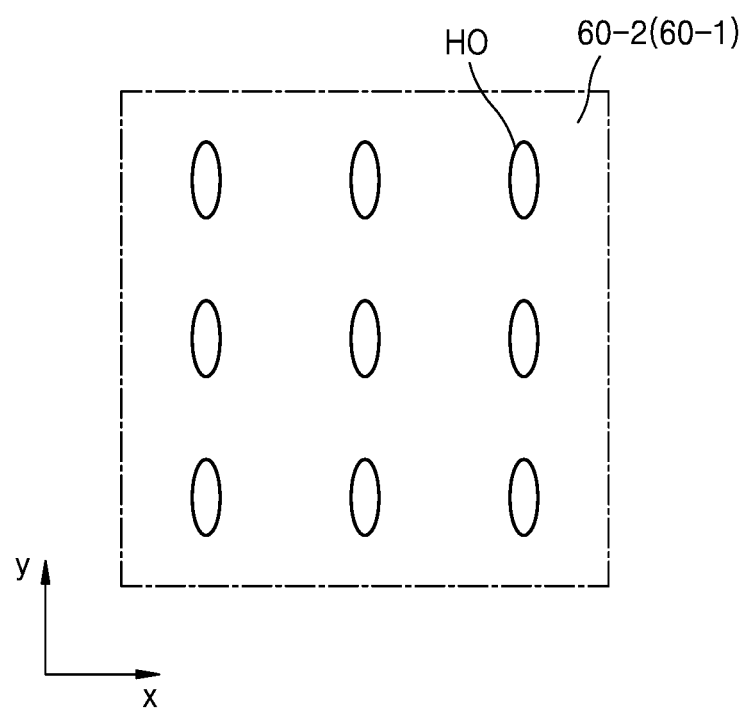

FIGS. 12A and 12B are plan views of one of the first reinforcing member layer 60-2 or the second reinforcing member layer 60-1 in the reinforcing member 60 according to an embodiment of the disclosure.

Referring to FIGS. 12A and 12B, in an embodiment, one of the first reinforcing member layer 60-2 or the second reinforcing member layer 60-1 includes open areas HO. A planar shape of each of the open areas HO is elliptical. The other of the first reinforcing member layer 60-2 or the second reinforcing member layer 60-1 is inserted into the open areas HO.

In an embodiment, the open areas HO is elongated in one direction. For example, the open areas HO are elongated in the x-axis direction as shown in FIG. 12A. In an embodiment, the open area HO are elongated in the y-axis direction as shown in FIG. 12B.

Figure 13:
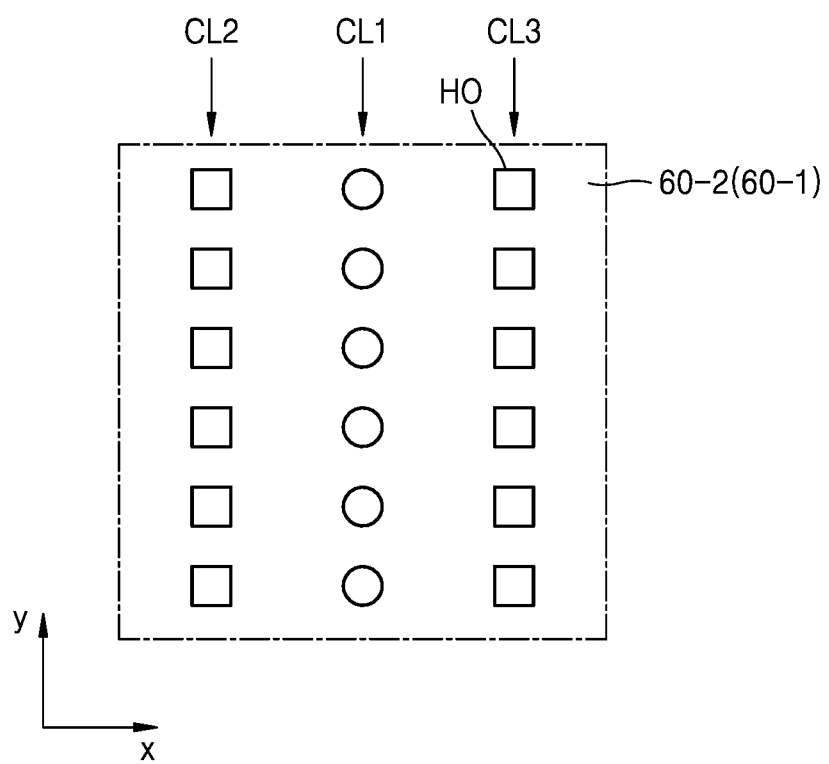
FIG. 13 is a plan view of one of a first reinforcing member layer or a second reinforcing member layer of a reinforcing member according to an embodiment of the disclosure.

FIG. 13 is a plan view of one of a first reinforcing member layer or a second reinforcing member layer in a reinforcing member according to an embodiment of the present disclosure.

Referring to FIG. 13, in an embodiment, one of the first reinforcing member layer 60-2 or the second reinforcing member layer 60-1 includes open areas HO. A planar shape of each of the open areas HO is circular or polygonal. The other of the first reinforcing member layer 60-2 or the second reinforcing member layer 60-1 is inserted into the open areas HO.

In an embodiment, the open areas HO in different columns (or rows) have different shapes from each other. For example, the planar shape of the open area HO in a central column CL1 (or row) has a circular shape, and the planar shapes of the open areas HO in a first left column CL2 (or first upper row) or a first right column CL3 (or first lower row) each have a polygonal shape, such as a square shape.

The planar shape of the open area HO may be variously modified. For example, the planar shapes of the open areas HO might not be symmetrical with each other with respect to the central column CL1 (or central row) as shown in FIG. 13, but the open areas HO at the first right column CL3 (or first upper row) and the first left column CL2 (or first lower row) with respect to the central column CL1 (or central row) may have different planar shapes. In an embodiment, the open areas HO in the central column CL1 (or central row) may have polygonal planar shapes, circular planar shapes in the first left column CL2 (or first upper row), and non-defined planar shapes in the first right column CL3 (or first lower row). In an embodiment, the planar shapes of the open areas HO may vary in every column (or row).

In an embodiment, when the open areas HO are arranged in a plurality of columns (or rows) that are on the left (or upper) or right (or lower) side of the central column CL1 (or row), the planar shapes of the open areas HO in respective columns (or rows) may differ from one another.

In an embodiment, one of the open areas HO may have a planar shape that differs from the planar shapes of the others in the same column (or row).

A display device according to embodiments of the disclosure provides clear images. A display device according to embodiments of the disclosure maintains a display surface that displays images as flat as possible while being unfolded.

It should be understood that embodiments described herein should be considered in a descriptive sense only and not for purposes of limitation. Descriptions of features or aspects within each embodiment should typically be considered as available for other similar features or aspects in other embodiments. While embodiments have been described with reference to the figures, it will be understood by those of ordinary skill in the art that various changes in form and details may be made therein without departing from the spirit and scope as defined by the following claims.

What is claimed is:

1. A display device, comprising:
a foldable display panel;
a reinforcing member disposed on one surface of the display panel and that supports an entire surface of the display panel; and
a cushion layer disposed on one surface of the reinforcing member,
wherein the reinforcing member comprises:
a first reinforcing member layer; and
a second reinforcing member layer that is inserted into the first reinforcing member layer or at least partially surrounds the first reinforcing member layer, wherein
one of the first reinforcing member layer or the second reinforcing member layer has a plurality of open areas, when viewed in a plan view, wherein each of the plurality of open areas is surrounded by a solid portion of the one of the first reinforcing member layer or the second reinforcing member layer.

2. The display device of claim 1, wherein one of the first reinforcing member layer or the second reinforcing member layer includes at least one of metal, glass reinforced fiber, or carbon reinforced fiber.

3. The display device of claim 2, wherein an other of the first reinforcing member layer or the second reinforcing member layer includes at least one of a silicon-based polymer, a urethane-based polymer, an aramid-based polymer, or elastomer.

4. The display device of claim 1, wherein
the plurality of open areas are spaced apart from each other at constant intervals.

5. The display device of claim 1, wherein each open area of the plurality of open areas has at least one of a non-defined shape, a polygonal shape, a circular shape, or an elliptical shape.

6. The display device of claim 1, wherein the reinforcing member further comprises an auxiliary layer disposed in the open area.

7. The display device of claim 6, wherein the auxiliary layer is integrally formed with and includes a same material as one of the first reinforcing member layer or the second reinforcing member layer.

8. The display device of claim 7, wherein
a cross-sectional area of the auxiliary layer perpendicular to a lengthwise direction of the auxiliary layer is less than
a cross-sectional area of at least one of the first reinforcing member layer or the second reinforcing member layer perpendicular to a lengthwise direction of at least one of the first reinforcing member layer or the second reinforcing member layer.

9. The display device of claim 1, further comprising a digitizer disposed on a lower surface of the reinforcing member or between the reinforcing member and the display panel.

10. The display device of claim 1, wherein a thickness of the reinforcing member is from about 50 μm to about 200 μm.

11. A display device, comprising:
a cover member;
a display panel disposed on a lower portion of the cover member;
a reinforcing member disposed on a lower portion of the display panel; and a digitizer disposed on a lower portion of the reinforcing member, wherein the reinforcing member comprises:

a first reinforcing member layer that has a lattice shape, when viewed in a plan view, wherein the lattice shape includes a plurality of open areas; and a second reinforcing member layer disposed on a surface of the first reinforcing member layer or that surrounds the first reinforcing member layer.

12. The display device of claim 11, wherein each of the plurality of the open areas have at least one of a circular shape, a polygonal shape, an elliptical shape, or a non-defined shape.

13. The display device of claim 12, wherein at least a part of the second reinforcing member layer has the lattice shape.

14. The display device of claim 12, wherein one of the first reinforcing member layer or the second reinforcing member layer includes at least one of metal, glass reinforced fiber, or carbon reinforced fiber, and an other of the first reinforcing member layer or the second reinforcing member layer includes at least one of a silicon-based polymer, a urethane-based polymer, an aramid-based polymer, or elastomer.

15. The display device of claim 14, wherein an elastic coefficient of one of the first reinforcing member layer or the second reinforcing member layer is from about 10 GPa to about 70 GPa.

16. The display device of claim 14, wherein an elastic coefficient of the other of the first reinforcing member layer or the second reinforcing member layer is from about 0.1 GPa to about 10 GPa.

17. The display device of claim 12, wherein the reinforcing member further comprises an auxiliary layer connected to the first reinforcing member layer and disposed in the open areas, wherein the auxiliary layer includes the same material as the first reinforcing member layer and is integrally formed with the first reinforcing member layer.

18. The display device of claim 17, wherein a cross-sectional area of the auxiliary layer is less than a cross-sectional area of the first reinforcing member layer.

19. The display device of claim 11, wherein a thickness of the first reinforcing member layer is from about 10 μm to about 100 μm.

20. The display device of claim 11, wherein a thickness of the reinforcing member is from about 50 μm to about 200 μm.

21. A display device, comprising:

a foldable display panel; and a reinforcing member disposed on one surface of the display panel and that supports an entire surface of the display panel, wherein the reinforcing member comprises:

a first reinforcing member layer that has a lattice shape, when viewed in a plan view, wherein the lattice shape includes a plurality of open areas; and a second reinforcing member layer that is inserted into the first reinforcing member layer or at least partially surrounds the first reinforcing member layer.

* * * * *